(12) United States Patent
Lilot et al.

(10) Patent No.: US 9,069,856 B1
(45) Date of Patent: Jun. 30, 2015

(54) EVALUATING ACCESS CONTROL LIST DATA FOR A SOCIAL NETWORK

(71) Applicant: Google Inc., Mountain View, CA (US)

(72) Inventors: Jean-Christophe Emmanuel Lilot, Mountain View, CA (US); Nishant Antul Thakkar, Kirkland, WA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/668,166

(22) Filed: Nov. 2, 2012

Related U.S. Application Data

(60) Provisional application No. 61/556,163, filed on Nov. 4, 2011.

(51) Int. Cl.
*G06F 17/30* (2006.01)
(52) U.S. Cl.
CPC ............... *G06F 17/30864* (2013.01)
(58) Field of Classification Search
USPC .......................................... 707/722; 705/319
See application file for complete search history.

(56) References Cited

U.S. PATENT DOCUMENTS

| | | | | |
|---|---|---|---|---|
| 8,302,164 | B2 * | 10/2012 | Lunt | 726/4 |
| 2007/0038931 | A1 * | 2/2007 | Allaire et al. | 715/526 |
| 2010/0223119 | A1 * | 9/2010 | Klish | 705/14.26 |
| 2010/0280965 | A1 * | 11/2010 | Vesterinen et al. | 705/319 |
| 2010/0287033 | A1 * | 11/2010 | Mathur | 705/10 |
| 2011/0093506 | A1 * | 4/2011 | Lunt et al. | 707/798 |
| 2011/0258042 | A1 * | 10/2011 | Purvy et al. | 705/14.49 |
| 2011/0264596 | A1 * | 10/2011 | Shifflett | 705/319 |
| 2011/0289011 | A1 * | 11/2011 | Hull et al. | 705/319 |
| 2012/0109836 | A1 * | 5/2012 | Chen et al. | 705/319 |
| 2012/0166274 | A1 * | 6/2012 | Krishnamoorthy | 705/14.49 |
| 2012/0232998 | A1 * | 9/2012 | Schoen | 705/14.66 |
| 2013/0110865 | A1 * | 5/2013 | Preetham et al. | 707/769 |

FOREIGN PATENT DOCUMENTS

JP         2008123233 A    *  5/2008

OTHER PUBLICATIONS

Authors: Kiran K. Gollu, Stefan Saroiu, and Alec Wolman, Title: "A Social Networking-Based Access Control Scheme for Personal Content", Earliest Archived Date on Wayback Machine: May 17, 2008.*

* cited by examiner

*Primary Examiner* — Rehana Perveen
*Assistant Examiner* — Robert F May
(74) *Attorney, Agent, or Firm* — Lowenstein Sandler LLP

(57) ABSTRACT

Methods, systems, and computer programs are presented for processing data to control display of followers of an entity to viewers of an entity page of the entity in a social network. One method includes detecting a request to view the entity page by a viewer. Fetching a first row of data associated with the social network. The method processes the first row of data to read a set of bits to determine whether certain ones of the users that are following the entity are to be displayed as following the entity in the entity page. The method also fetches a second row of data to determine whether the viewer is in one of the groups of the users that are following the entity and not displaying the users that follow the entity to the viewer when the viewer is not in one of the groups.

20 Claims, 13 Drawing Sheets

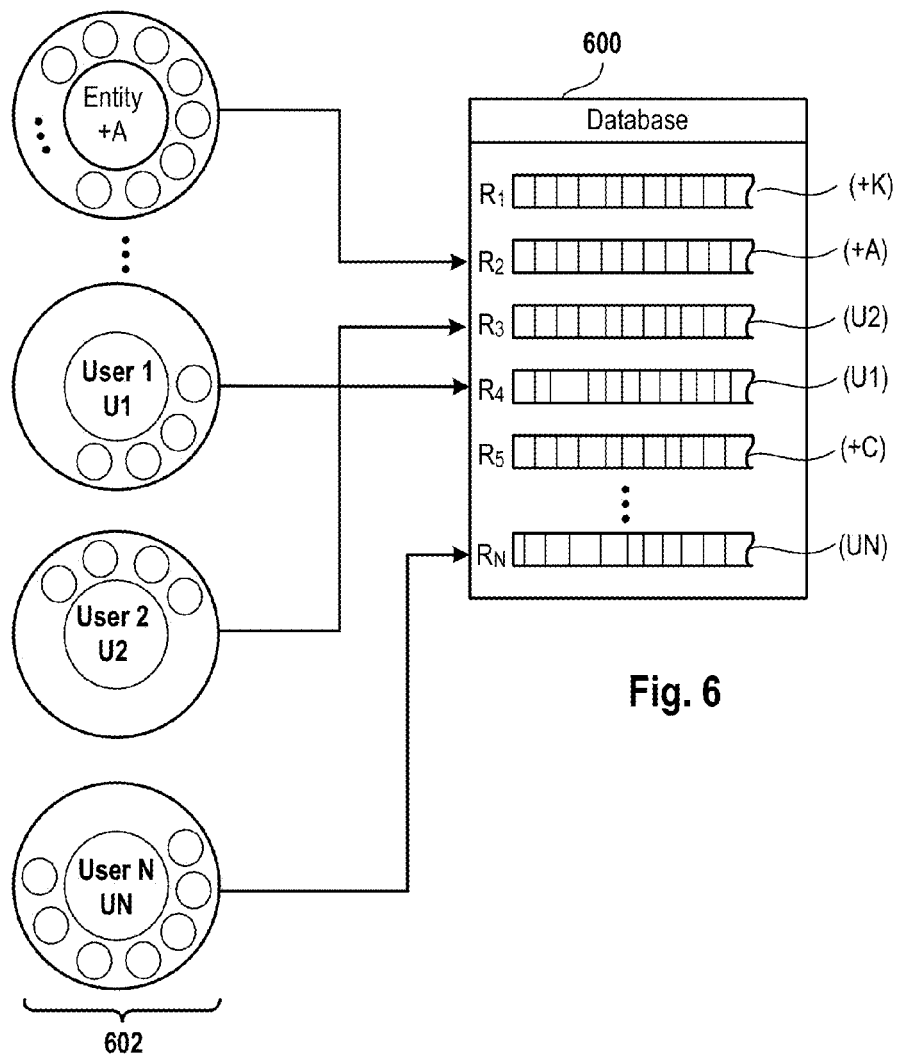
Fig. 6
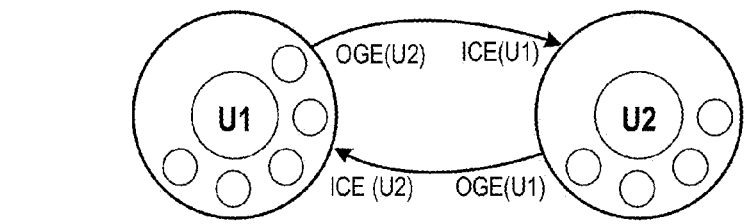
Fig. 7
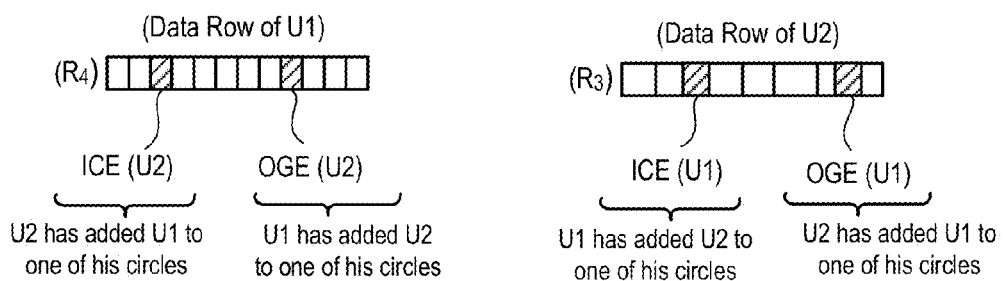

EVALUATING ACCESS CONTROL LIST DATA FOR A SOCIAL NETWORK

CLAIM OF PRIORITY

This application claims priority to U.S. Provisional application No. 61/556,163, filed on Nov. 4, 2011, which is herein incorporated by reference.

BACKGROUND

The communication capability provided by social networks has opened new forms of communication in today's society, making it easier for people to communicate with each other, as well as providing new vehicles of communications between people and businesses, or with other community groups. As people's interest in using social networks for communication has grown, so has the interest of businesses in using social networks to communicate with people, enabling a new form of communication for keeping customers informed and promote their products.

SUMMARY

Embodiments of the present disclosure provide methods, systems, and computer programs for processing data to control display of followers of an entity to viewers of an entity page of the entity in a social network. It should be appreciated that the present disclosure can be implemented in numerous ways, such as a process, an apparatus, a system, a device or a method on a computer readable medium. Several embodiments of the present disclosure are described below.

In one embodiment, a method for processing data to control display of followers of an entity to viewers of an entity page of the entity in a social network is provided. The method includes detecting a request to view the entity page by a viewer. Then, fetching a first row of data from a database associated with the social network. The first row is of the entity and the first row of data includes a set of bits from users that follow the entity. The method examines the first row of data to read the set of bits. The examining establishing a first determination as to whether certain ones of the users that are following the entity are to be displayed as following the entity in the entity page. Then, fetching a second row of data from the database. The second row of data being for the viewer. The method examines the second row of data to establish a second determination as to whether the viewer is in one of the groups of the users that are following the entity and not displaying the users that follow the entity to the viewer when the viewer is not in one of the groups. The method enables display of users that are following the entity to the viewer when the users pass the first determination or the first and second determination, the method is executed by at least one processor.

These and other embodiments can include one or more of the following features.

One feature may include, wherein the first row of data including first edge (FE) data of users of the social network that have added the entity to one of their following groups, the first row of data further including second edge (SE) data that identify users that the entity has added to one of its following groups, wherein the FE data of users that have added the entity to one of their following groups includes a set of bits, the set of bits include a visible bit and a public bit.

One feature may include, wherein the set of bits in the FE of users are updatable based on changes made by the users that follow the entity, the changes including one or more of deleting the entity from groups, or moving the entity to a group having different settings for the set of bits.

One feature may include, the second determination identifies FE data of the second row of data of viewer to determine if an access control list (ACL) bit validates that the viewer is in one of the groups of the users that are following the entity.

One feature may include, wherein each user that follows the entity passes the set of bits to the entity in a first edge so that the first determination can be made directly from the first row of data of the entity.

One feature may include, wherein certain ones of the users that follow the entity are examined based on first edges in the second row of data of the viewer.

One feature may include, wherein the second determination identifies FE data of the second row of data of viewer to determine if an access control list (ACL) bit validates that the viewer is in one of the groups of the users that are following the entity.

In another embodiment, a method for processing data to control display of followers of an entity to viewers of an entity page of the entity in a social network is disclosed. The method includes detecting a request to view the entity page by a viewer. The viewer has a user account in the social network and the entity has an entity account in the social network. The method fetches a first row of data from a database associated with the social network. The first row is of the entity, and the first row of data includes first edge (FE) data of users of the social network that have added the entity to one of their following groups. The first row of data further includes second edge (SE) data that identify users that the entity has added to one of its following groups. The FE data of users that have added the entity to one of their following groups include a set of bits, and the set of bits include a visible bit and a public bit. The method examines the visible bit and the pubic bit in the FE data in the first row of data of the entity. The examining establishes a first determination as to whether certain ones of the users that are following the entity are to be displayed to viewers as following the entity in the entity page. The method fetches a second row of data from the database. The second row of data being for the viewer. Then, examining the second row of data to establish a second determination as to whether the viewer is in one of the groups of the users that are following the entity. The method displays users that are following the entity, in the entity page, to the viewer when the users pass the first determination or the first and second determination, the method being executed by a processor.

These and other embodiments can include one or more of the following features.

One feature may include, wherein the first determination identifies if the users are visible or not visible and identifies if the users are public or not public, such that users that are not visible are not displayed in the entity page to the viewer, such that users that are visible but not pubic use the second determination made from the second row data.

One feature may include, wherein the second determination identifies FE data of the second row of data of viewer to determine if an access control list (ACL) bit validates that the viewer is in one of the groups of the users that are following the entity.

One feature may include, wherein the set of bits in the FE of users in the first row of data of the entity are defined by users that following the entity.

One feature may include, wherein the set of bits in the FE of users are updatable based on changes made by the users that follow the entity, the changes including one or more of deleting the entity from groups, or moving the entity to a group having different settings for the set of bits.

One feature may include, wherein the second determination identifies if the viewer is not in one of the groups of the users that follow the entity, and not displaying the users that follow the entity to the viewer when the viewer is not in one of the groups.

One feature may include, wherein the ACL bit is stored in the second row of data and is set associated with all FE in the second row of the viewer, the set of bits being associated with corresponding second edges in the second row of data.

One feature may include, wherein the setting of the set of bits and the ACL bit are obtained based on settings of groups by each user, such that the entity adheres to the settings defined by each user so that viewers only view those followers that allow the entity to display their status as following the entity to viewers of the entity page.

One feature may include, wherein the first determination and the second determination is performed by analysis of the first row of data and the second row of data utilizing two fetches to the database.

One feature may include, wherein each user that follows the entity passes the set of bits to the entity in a first edge so that the first determination can be made directly from the first row of data of the entity.

One feature may include, wherein certain ones of the users that follow the entity are examined based on first edges in the second row of data of the viewer.

One feature may include, wherein the second determination identifies FE data of the second row of data of viewer to determine if an access control list (ACL) bit validates that the viewer is in one of the groups of the users that are following the entity.

The method defined herein can be embodied on systems, such as servers and hardware that controls the logic operations of the above defined methods. These systems can therefore preform the operations to evaluate access control list data, bit settings, or combinations thereof to identify whether or not to display the identity of followers of certain commercial entities on the account pages of the entity of the social network.

These and other embodiments can include one or more of the following features. [cut/paste dependent claim language]

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIG. 6 illustrates example users, including entities and people users that have accounts in a social network, in accordance with one embodiment of the present disclosure.

FIG. 7 illustrates an example of a relationship between user U1 and user U2, in accordance with one embodiment of the present disclosure.

FIGS. 9A-1 to 9A-3 illustrate case scenarios, where user U1 has added entity A+ to one of its circles, in accordance with one embodiment.

DETAILED DESCRIPTION

The following embodiments describe methods, systems, and computer programs for processing data to control display of followers of an entity to viewers of an entity page of the entity in a social network. It will be apparent, that the present embodiments may be practiced without some or all of these specific details.

Figure 1:
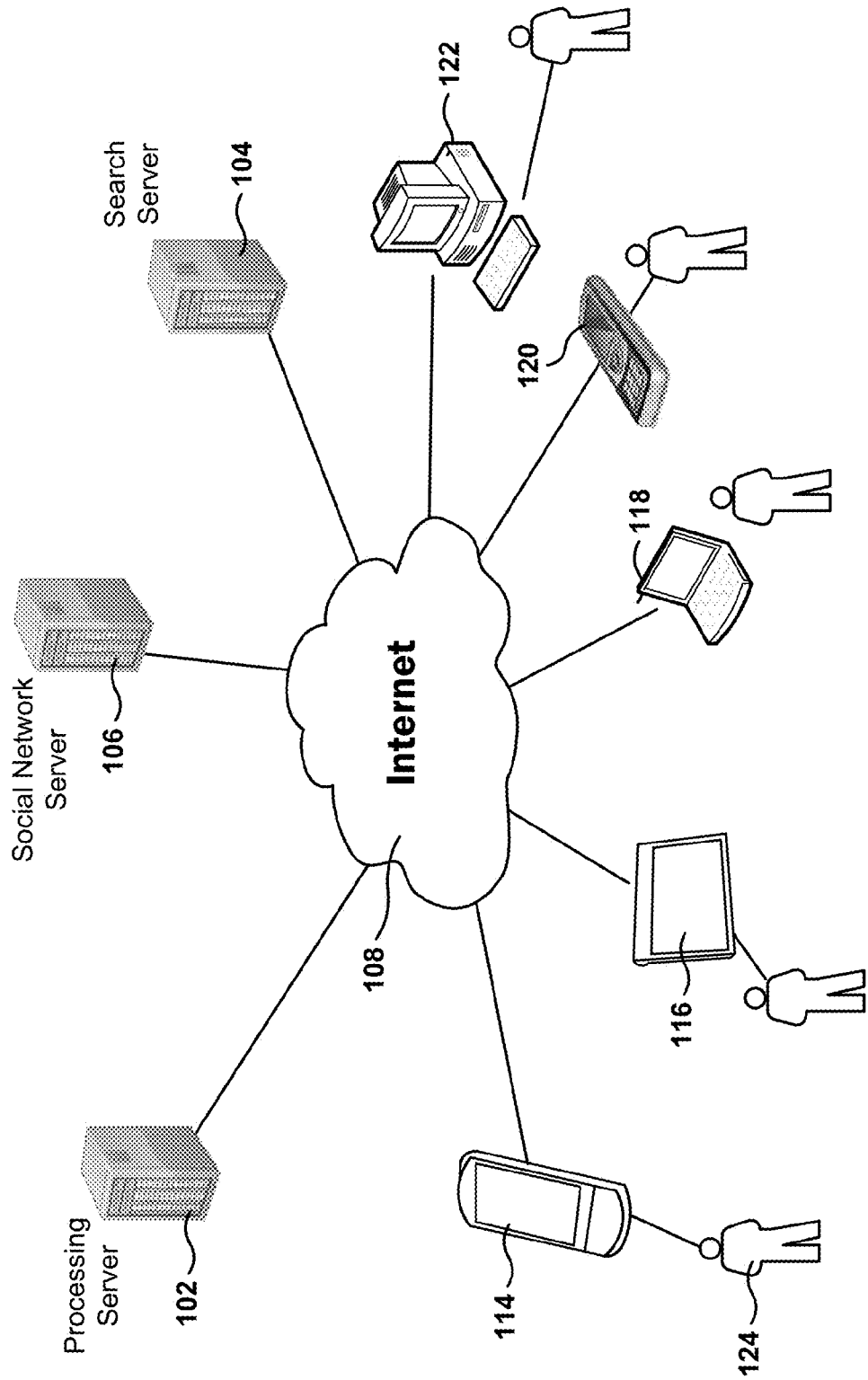
FIG. 1 illustrates the architecture of a system for implementing embodiments of the disclosure, according to one embodiment.

FIG. 1 provides one example architecture of a system that may utilize embodiments described herein. Users 124 interact with each other in the context of a social network, where users include real people and entities. In one embodiment, entities perform interactive actions similar to people, although an entity may not be an individual person. For instance, an entity may be a commercial enterprise that may wish to market goods or services. In some embodiments, a person may be an entity as well when the person is acting as a public figure, such as a popular artist, a political figure, a world leader, etc. Each user has an account in the social network, and the account includes at least a user name. In addition, each account includes a profile of the user with additional information about the user, such as birth date, gender, residence, favorite activities, etc. The user is in control of what information is added to the profile, and what information is shared with others. A user may access the social network through different devices such as a smart phone 114, a tablet computer 116, a laptop 118, a mobile phone 120, a personal computer 122, or any computing device that provides access to the Internet. Of course, the illustrated devices are only examples.

In one embodiment, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In one embodiment, the relationships established in the social network may be utilized in other contexts. Processing server 102 manages the electronic messages between persons and non-person entities, by enforcing rules that enable or disable communications and/or actions within the social network. Search server 104 provides Internet search capabilities.

In one embodiment, the social network provides customizable controls that people may use to manage interactions and communications with non-person entities. In one example, the logic executing the social network may define various services and controls. One example service is designed for real person users (e.g., user accounts). Another example service is designed for non-person entities (e.g., entity accounts). The entity account of the entity, on the other hand, is similar to a user account of a person, however the services and controls are different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a corporation, a business, an entity account, etc. An entity may be a user, although its use will be through an entity account. A user, as referred to herein, is a generic term for a person or entity, unless otherwise noted. A non-entity user, therefore, may utilize the social network through a user account.

In one embodiment, the social network provides entities with a specific type of interface for posting messages, communicating, sharing, and generally interacting within the social network. In one embodiment, this interface for entities is referred to as "entity pages," indicated by a token, e.g., "+", followed by the name of the entity in the social network (e.g., Acme corporation has a "+Acme" page). Real-persons have "person pages," which are different from entity pages and have different functionality, although some features are common to both entity pages and person pages. Although the symbol "+" and word "plus" is referred to herein as denoting a type of site or place within the social network, it should be appreciated that any symbol, identifier, word, or character may be used to define or identify the social services. In an alternate embodiment, the services can be provided without the use of any special symbols or denoted nomenclature. Thus, so long as the social network site provides the functionality defined herein, the nomenclature utilized to denote the services can take on any form, format or identifier.

In one embodiment, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In one embodiment, a user can have multiple privileges, which will allow the user to log into her one account, and based on her privileges, will be allowed to access both accounts. Alternatively, each account will have its own login.

In one embodiment, a person controls her relationships with entities (e.g., entity pages). In one embodiment, interactions between person and entity requires person approval (e.g., an addition of the plus page to the person's social network, or a mention by the person of the entity, which are discussed in more detail below). Otherwise, entity pages present a similar behavior as person pages, once the person has initiated engagement with the entity.

Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1 should therefore not be interpreted to be exclusive or limiting.

Figure 2:
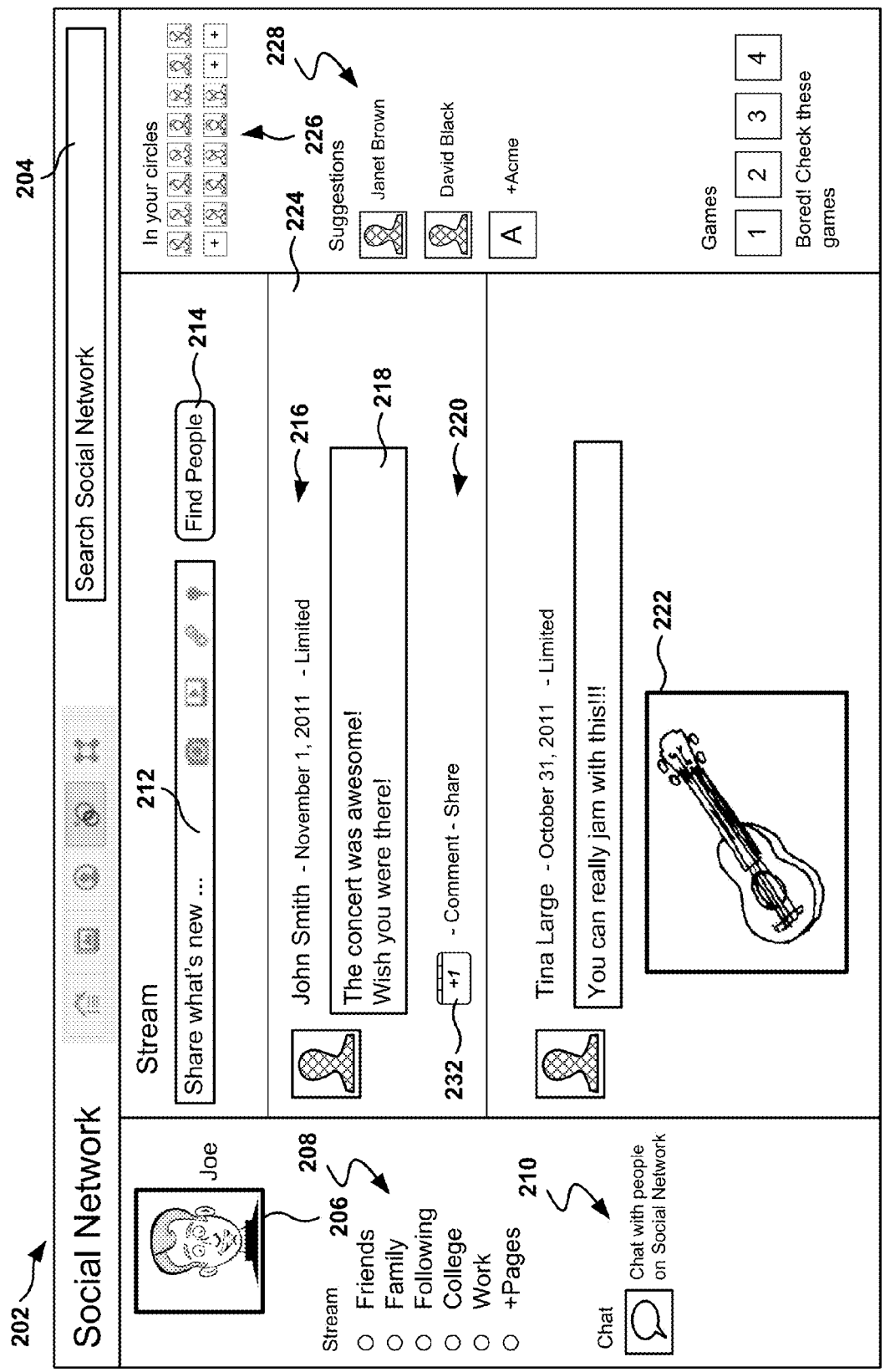
FIG. 2 is a person's web page for interfacing with a social network, according to one embodiment.

FIG. 2 is a person's web page for interfacing with a social network, according to one embodiment. For example, the person is shown logged into her user account. In one embodiment, posts received by a user are referred to as content of a stream in the social network. Page 202 is an example snapshot of a page for viewing a person's stream in the social network, and search field 204 is an input area for searching the social network or other content.

In one embodiment, the stream is presented in a middle panel of page 202. Input box 212 enables the person to add new posts in the social network. When the person enters a new post, the person is able to select the destination for the post. The destination could be to the complete social network (e.g., a public post), to a person, or to one or more groups defined by the person.

In one embodiment, the groups defined by the person are referred to as "circles," but other configurations for defining groups are also possible. Examples include various graphically designed interfaces or text based lists, dialog boxes, pull downs, radio buttons, and other interfaces defined from a combination of graphical elements, text, images, pictures, combinations thereof, etc. More details regarding the creation of circles are provided below with reference to FIG. 3. In one embodiment, the post may be a text message, a photo, a video, a link to a webpage, or a location of the person. Thus, the content and form of the post includes data that can be presented, displayed, listened to, interfaced with, received, sent, shared, approved, or disapproved, etc.

In one embodiment, the stream includes posts added by the person, by others socially linked to the person, or by an entity that the person has chosen to follow (e.g., be linked with/to in the social network). In one embodiment, an entity may be restricted from posting to a person's stream, unless the person has established a social link with the entity beforehand, e.g., the person has chosen to follow the entity.

In one embodiment, each post 224 may include information 216 about the author, the timestamp of the post, and the scope of the post (e.g., public, limited, etc.). Example post 224 may include a text message entered by person "John Smith," but other types of posts are possible, such as photo 222, a video, a link, data, etc. The social network provides options 220 to respond to the post, such as providing an endorsement of the post, adding a comment to the post, or sharing the post with others.

As used herein, an endorsement is a public recommendation of an item, such as a webpage, a person, a post, an entity, etc. An endorsement may also be referred to or provided as an acknowledgment, a +1, a thumbs-up, a ✓ (check) mark, a confirmation, a ratification, a validation, a seal of approval, a testimonial, support, advocacy, an approval, a ratification, etc. In one embodiment, a button is provided in various web pages to enable the person to provide his or her endorsement. See for example +1 button 232. The various web pages can be pages on accounts of the social network, on pages of third party web sites, on search pages, in lists of search results, etc. The +1 button 232 is provided, in one embodiment, as an icon that can be selected by the user. When selected, the count associated with the +1 button is displayed, so as to provide the user with information regarding the number of other users that may have selected the +1 button.

Therefore, an endorsement button is not limited to use in the social network, and the endorsement button may appear in a variety of places and sites across the Internet. For example, an endorsement button may be next to an Internet search result, an Internet ad, a news article, a product, etc. When the person presses the endorsement button, a count associated with the item endorsed is incremented. The count measures the popularity of the item, and as people endorse an item, the counter associated with the item increases. In one embodiment, the action of endorsing an entity in the social network does not cause the entity to be linked with the person in the social network. In another embodiment, for a link to be established in the social network between the person and the entity, a different operation is used where the person explicitly adds the entity to the person's social network. The explicit add can be performed by user selection on an interface, addition of an entity to one of their groups, e.g., circle, or selection of a button, icon, or some input control to follow the entity. The following can also be triggered automatically, based on the user's approval to take this action each time the user views, finds, selects, or interfaces with an account of an entity.

In one embodiment, a "mention" is an explicit reference to a user in a communication. A mention allows the creator of the post to grab someone's attention to a post because of the introduction of a mention identifier with, for example, someone's name. In one embodiment, a mention is performed by utilizing the '+' or '@' signs followed by the name of a person or entity. It is noted that a "+" sign may be used to mention a person or an entity. When a person or an entity is mentioned within the context of the social network, the person or entity may receive a notification that they have been mentioned in a post (depending on notification settings). The user is also able to see the entirety of the post on which the user is mentioned, even if the post wasn't originally shared with the user.

Button 214 gives the person the ability to enter a different webpage, which provides an interface to identify search parameters for finding people or entities in the social network. A profile picture of the person 206 may be provided on the left side of page 202. In addition, stream filtering options 208 allows the person to limit or tune what is presented on the stream. In one embodiment, the filtering options include radio buttons to select or deselect the groups created by the person. In addition, the filtering options also include a radio button to enable or disable messages from entity pages in the stream. Although radio buttons are used, other types of user selectable controls may be used, such as drop downs, text fields, toggles, voice inputs, etc. In one embodiment, a chat button 210 is provided to allow the person to engage in conversation with others in the social network. On the right panel, icons 226 represent users in the social network that are linked with the person. In addition, the social network provides suggested new users in area 228. It is again noted that the layout of the features on the page 202 is only one example, and the layout can vary based on site designer preferences.

Embodiments of the disclosure allow people to be in control of social messages. For an entity to initiate communication with the person, the person has to first add explicitly the entity to its social network. In one embodiment, an entity is not able to initiate communications in the social network with a person that has not added the entity to its social network, or that has explicitly mentioned the entity in a post.

The person is able to perform certain operations affecting the relationship between the person and the entity. The person may endorse the entity, or the person may add the entity to one of her social groups defined in the social network. In one embodiment, the fact that the person endorses an entity does not enable the entity to freely initiate full communications or posts with the person. Of course, if the person and the entity are socially linked, the entity may initiate communications with the person and post on the person's user account.

Figure 3:
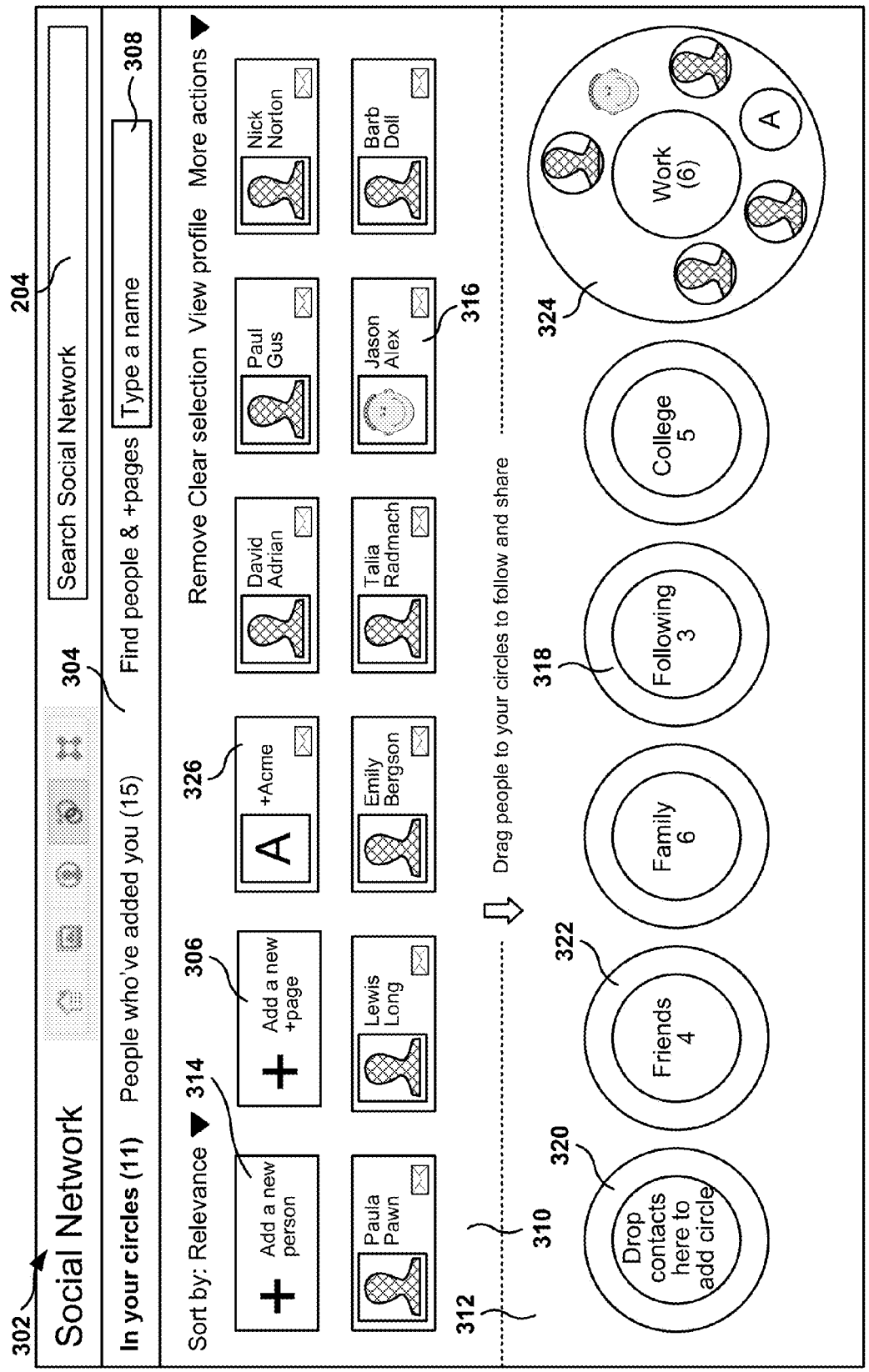
FIG. 3 is a web page for managing user groups within the social network, according to one embodiment.

FIG. 3 is a web page 302 for managing user groups within the social network, according to one embodiment. Bar 304 provides selections options for choosing users, which are then displayed in users area 310. In the embodiment shown in FIG. 3, the person has selected the option "In your circles" to display users that are currently in the person's circles (e.g., user defined groups). A second option in bar 304 allows the selection of persons that have added the owner of the page to their groups in the social network. In addition, bar 304 includes an input field 308 to search for people or entities. In one embodiment, the social network provides an option to follow other users anonymously. If a person follows another user anonymously, the person will be able to see the public posts of the user, and the person or entity being followed would not be aware that this person is following them.

User's area 310 displays icons, images, pictures or indicators associated with several users, and circles area 312 includes the groups defined by the user. In one embodiment, the person is able to add users to the circles in circles area 312 by selecting a user icon, dragging the icon to the circles area 312, and dropping the icon in one of the circles. To delete a user from a circle, the user icon inside the circle is dragged from the circle and dropped outside the circle. In one embodiment, when the person moves the mouse over a circle, the circle is enlarged to show the user icons corresponding to the users belonging to that circle. For example, after placing the mouse over circle 324, circle 324 is expanded, having now a larger size than the other circles, and presents the users currently in that circle. Other circles, such as circle 322 named "Friends," are presented in a smaller size than circle 324 and do not show their contents. To create a new circle, the person can drop a user from users area 310 in circle 320.

In one embodiment, the social network creates a default circle for inclusion of entity pages. The embodiment of FIG. 3 provides a circle 318 named "Following" for inclusion of entity pages. The entity pages do not have to be added to circle 318, and may be added to any of the circles defined by the person. In one embodiment, persons and entities can also be added to more than one circle. In one embodiment, when a person starts following an entity, the entity is automatically added to the "Following" circle, although the person may later remove the entity or move to another circle. In another embodiment, when the decision is made to follow an entity, a drop down provides the user with options to add the entity to any one of the circles previously created by the user or to a following circle. This option allows for direct adding of users to circles, without first adding them to the following circle 318.

The users in user area 310 can be real persons (e.g., person 316 "Jason Alex") or can be entities (e.g., entity 326 "+Acme"). People are able to place real persons or entities in any of the circles below, and a circle may have just people, just entities, or a mix of people and entities.

In one embodiment, user area 310 also includes a couple of selection boxes for adding persons 314 or entities (e.g., +pages) 306. When the person selects one of these boxes, options are presented to enter the name of a person or an entity, or to perform a search on the social network. In another embodiment, a unique box is presented to search for people or entities. In one embodiment, once the person enters a "+" sign as the first character of the search, the social network limits the search to entities. Otherwise, the search is limited to real persons. Again, it should be understood that any other symbol or token can be used to filter, identify or modify a search query.

Figure 4:
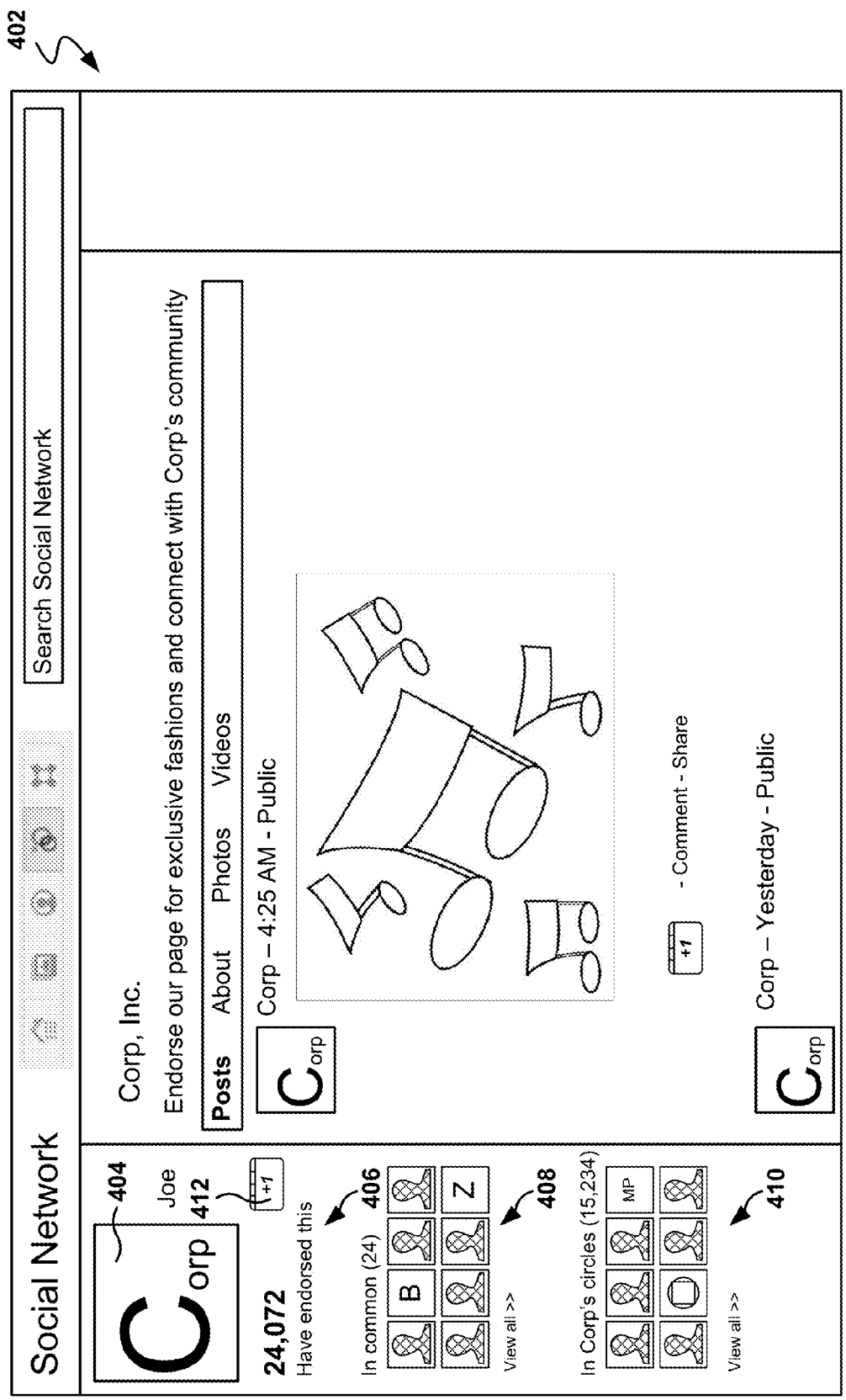
FIG. 4 shows a profile page of an entity in the social network, according to one embodiment.

FIG. 4 shows the profile page 402 of an entity in the social network, according to one embodiment. When a user clicks on the name of another user, the associated profile page for the user is presented. FIG. 4 shows the profile page of an entity. In the middle panel, posts from the entity that are visible to this user are presented, with a similar format to the posts shown in the stream of FIG. 3.

The profile page 402 includes a region that can accept an icon 404 associated with the entity and the name of the entity next to the icon 404. In addition, an endorsement button 412 gives the person or other entity an option for endorsing the entity associated with the profile page. Counter 406 provides information about the number of people or entities that have endorsed this entity. In one embodiment, the profile page of a person may not include endorsement button 412. In another embodiment, the social network allows for the endorsement of real people, and an endorsement button is available to endorse people.

Profile page 402 also includes information about users 408 in the user's circles that are also following this entity, e.g., users "in common" following this entity. This information helps the entity improve its corporate image by showing related users that also are associated with the entity. In addition, information 410 is provided about users or entities of the social network that are in the entity's circles but that are not currently in any of the user's circles.

In one embodiment, the social network enforces a privacy mechanic, e.g., a policy, to protect people from undesired messages. In one embodiment, the policy defines two types of users: people and entities. The communication rules in the social network are different for people and for entities. A person may initiate contact with an entity, but the entity may not initiate contact with the person. Once the person establishes a social link with the entity (e.g., the person adds the entity to one or more circles), then the entity may start communicating with the person. In one embodiment, an entity may initiate contact with other entities (of course, subject to user privacy settings), but not with real people (e.g., user accounts). This policy puts the person in command of the communication flow between people and entities.

In one embodiment, the privacy policy defines that people may not have automatic acceptance of tags for photos posted on the social network by entities. However, there can be automatic acceptance of tags from entities by other entities.

Figure 5:
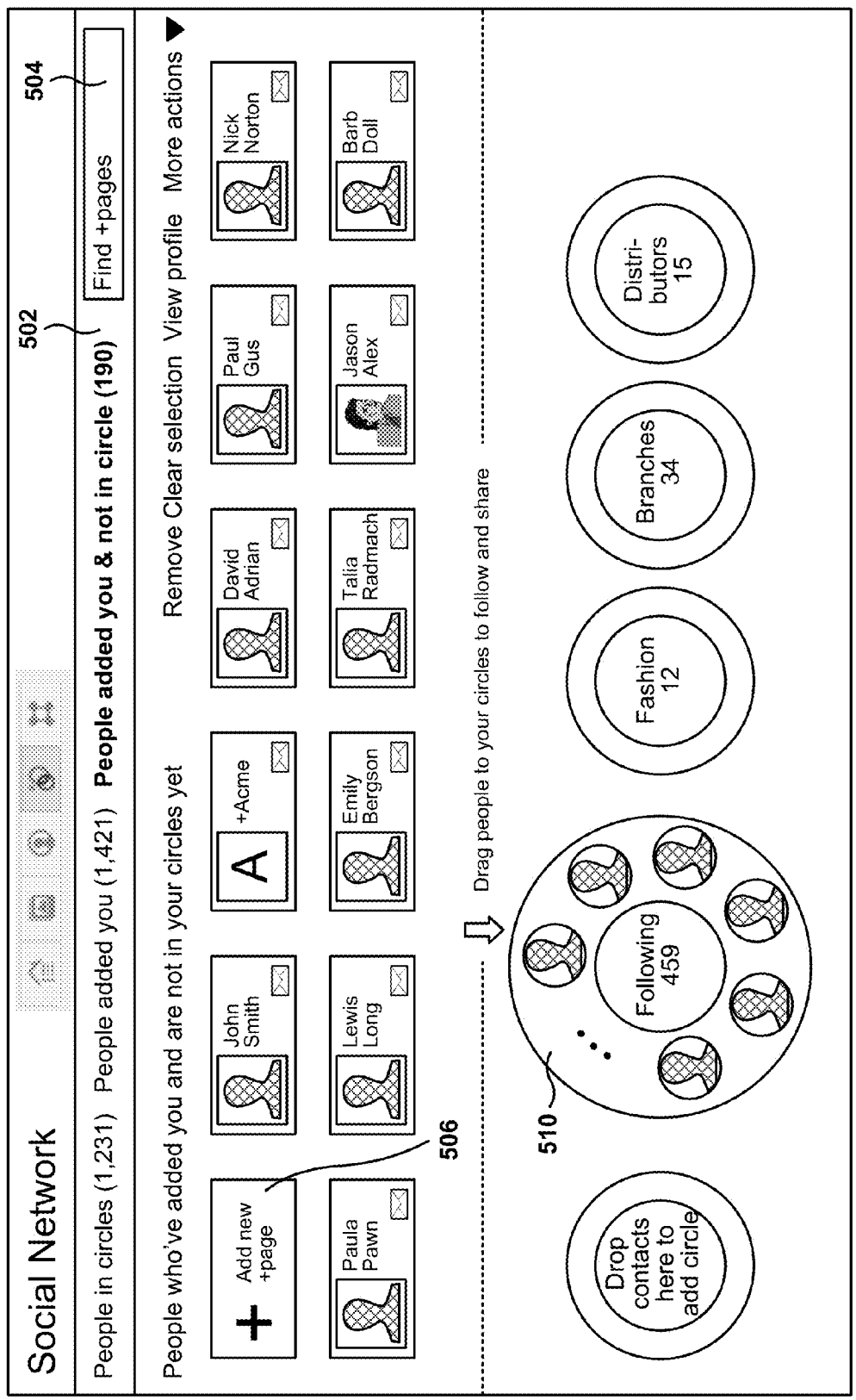
FIG. 5 is a web page for the management of user groups by an entity, according to one embodiment.

FIG. 5 is a web page for the management of user groups by an entity, according to one embodiment. Bar 502 for selecting users includes options for showing people already in the entity's circles, showing people that are following the entity, and showing people that are following the entity and not yet in a circle. The search box 504 is different from the search box 308 of FIG. 3 because an entity cannot search for people, or be allowed to find people to first approach. An entity may only search for other entities (e.g., +pages). Additionally, because the entity may not search for people, the circle editor for entities does not include the icon 314 of FIG. 3 to add new persons. Entities are only provided with icon 506 to add other entities. Although the functions of this mechanic are described with reference to icons that are present or not present, other icons, text, windows, selection features may be used.

In one embodiment, the social network provides a default circle 510 to the entity for adding users followed by the entity. Circle 510, named "Following" in the sample of FIG. 5, is intended to be used for adding users that are being followed by the entity, in response to the person's initiated following of the entity. However, the entity may add other circles and organize the users followed as desired by the administrator of the entity page. For example, the embodiment of FIG. 5 illustrates a page that includes, besides the Following circle 510, a Fashion circle (e.g., to include other related companies in the fashion industry), a branches circle (e.g., to include retail outlets for the entity), and a Distributors circle (e.g., to include the distributors that carry the entity's products).

The entity may add each user to more than one circle. For example, the entity might create circles by geographic location in order to better target marketing messages (e.g., United States, South America, Europe, Asia, etc.), or may create circles according to demographic criteria (e.g., 5-15 years old, 16-25, 25-50, and 51+). The number and type of circles (e.g., groups) created by the entity are limitless. The circles can be created for limited times, and people can be dynamically moved by the entity or an algorithm set by the entity.

In one embodiment, the social network provides an automatic creation of circles, based on the parameters selected by the entity and executed by the algorithm, or based on user characteristics. In one embodiment, this feature is referred to as suggested circles. Each suggested circle is associated with a respective one or more attributes, such as geographic location, age range, gender, language, country, etc. When a person first starts following an entity, the person is automatically added to the entity's suggested circles that match the person's characteristics. For example, a person is added to a circle for the city of San Jose if the person lives in San Jose, the person is added to a circle for ages from 10 to 20 if the person is 19 years old, the person is added to a circle for United States if the person lives in the United States, etc.

It is noted that each person is added to suggested circles when the person has provided the corresponding information to the social network (e.g., provided the information to the user profile) and the person has allowed the social network to use this or part of the information for selection of people to be added to the corresponding circles. In one embodiment, the content of the suggested circles is not available for inspection by the entity. This way, the entity does not receive information about the person, although the entity can target its marketing messages to the appropriate segments due to the infrastructure provided by the suggested circles.

The mechanic of suggested circles, in one embodiment, is transparent to people, and settable by administrative functions of the entity. For example, a person might receive a message from a company, but the person does not know why she received the message. The reason the person received the particular message may be, for example, because the entity decided to send that message to all of the people or entities that were part of one of their circles. As another example, the entity may decide to move certain people and entities into a circle for an upcoming event. Before the event, the entity can set a campaign to notify those people and entities regarding information, specials, coupons, etc., as it pertains to the upcoming event. Once the event is done, the entity can manually move the people and entities back to their originally established default circles. In still another embodiment, the users that were added to the event circle can simply be copied (as a second instance) to the event circle. When the event is done, the event circle is deleted. The users, however, are still present in their previously defined circles of the entity.

In another embodiment, the suggested circles are administered by the entity because the social network provides information about the person to the entity (of course, the person's information (or only certain specific information) provided must be approved by the person). In one embodiment, the entity is able to manually assign people to suggested circles according to their characteristics in order to customize marketing communications or any other type of communication.

FIG. 6 illustrates a broad level illustration of users, including entities and people users that have accounts in a social network, in accordance with one embodiment of the present disclosure. In the illustrated example, each of the users, including entities, will have data associated with their account stored in a database 600. Database 600 is, in one embodiment, defined by a plurality of rows. Each of the rows may have corresponding columns that identify the type of data to be stored in each of the cells of a row. In another embodiment, each cell in a row may be defined with a different structure, such that columns are not associated with a fixed type of data. In one example, as the number of connections in the social grid of a particular account increases, the row associated with the account will correspondently grow.

In the example illustrated, entity +A is shown to store its data in row R2, user 1 U1 is shown to store its data in row R4. U2 is shown to store its data in row R3, and user UN is shown to store its data in row Rn. As the social network grows, more user accounts will establish different rows in database 600. The size of the data stored in each row will also increase as the number of connections in the social network increase. As will be described below with respect to FIG. 7, data stored in each row may include edge data. Edge data represents connections between users in the social network. For example, the edge data can include information regarding which user has added particular users to their circles, and information regarding the privacy rules associated with those users in particular circles. This data, based on interactions between users, is therefore stored in the particular row in database 600.

Database 600 is shown as a single database, however, it should be understood to database 600 can be distributed database across a large-scale network. Users accessing the database across the world can therefore access various instances of database 600, and their corresponding rows. Accordingly, the rows associated with each user can scale based on the size of the associations between a particular user and other users. By managing this information in each row for a particular account, it is possible to examine a particular row in the database 600 to identify connections between other users, as well as privacy settings associated with the relationships established by a particular user. Other implementations are possible. For example, the data can be stored in structures other than a database or other than in the form of rows, e.g., as directed graphs.

FIG. 7 illustrates an example of a relationship between user U1 and user U2, in accordance with one embodiment of the present disclosure. This relationship will therefore establish edges in the rows of each of the respective users. In the example, user U1 has added user U2 to one of its circles, and user U2 has also added user U1 to one of its circles. However, it should be appreciated that it is possible for the relationship between user U1 and user U2 to be single directional. That is, it is possible that one of the users adds the other user to one of its circles, but the other user does not add the first user to its circles.

In that case, only one arrow between user U1 and user U2 is made. But, in the illustrated example, each of the users U1 and U2 have added each other to their circles. In such a situation, the rows of each of the users in the database 600 will also reflect the respective relationships by containing edge data in the respective rows, as illustrated herein. For example, the row R4 is associated with user U1 and the row R3 is associated with user U2. When user U1 adds user U2 to one of its circles, and outgoing edge OGE (U2) is defined and stored in R4, and an incoming edge ICE (U1) is received by user U2 and stored in R3.

In a similar manner, when user U2 adds user U1 to its circles, and outgoing edge OGE (U1) is defined and stored in R3, and an incoming edge ICE (U2) is received by user U1 and stored in R4. Using this nomenclature, and mechanic for storing data to rows of each account of a particular user, it is possible to maintain a graph of the relationships of any particular user with any other user in the social graph when a relationship is present.

Figure 8A:
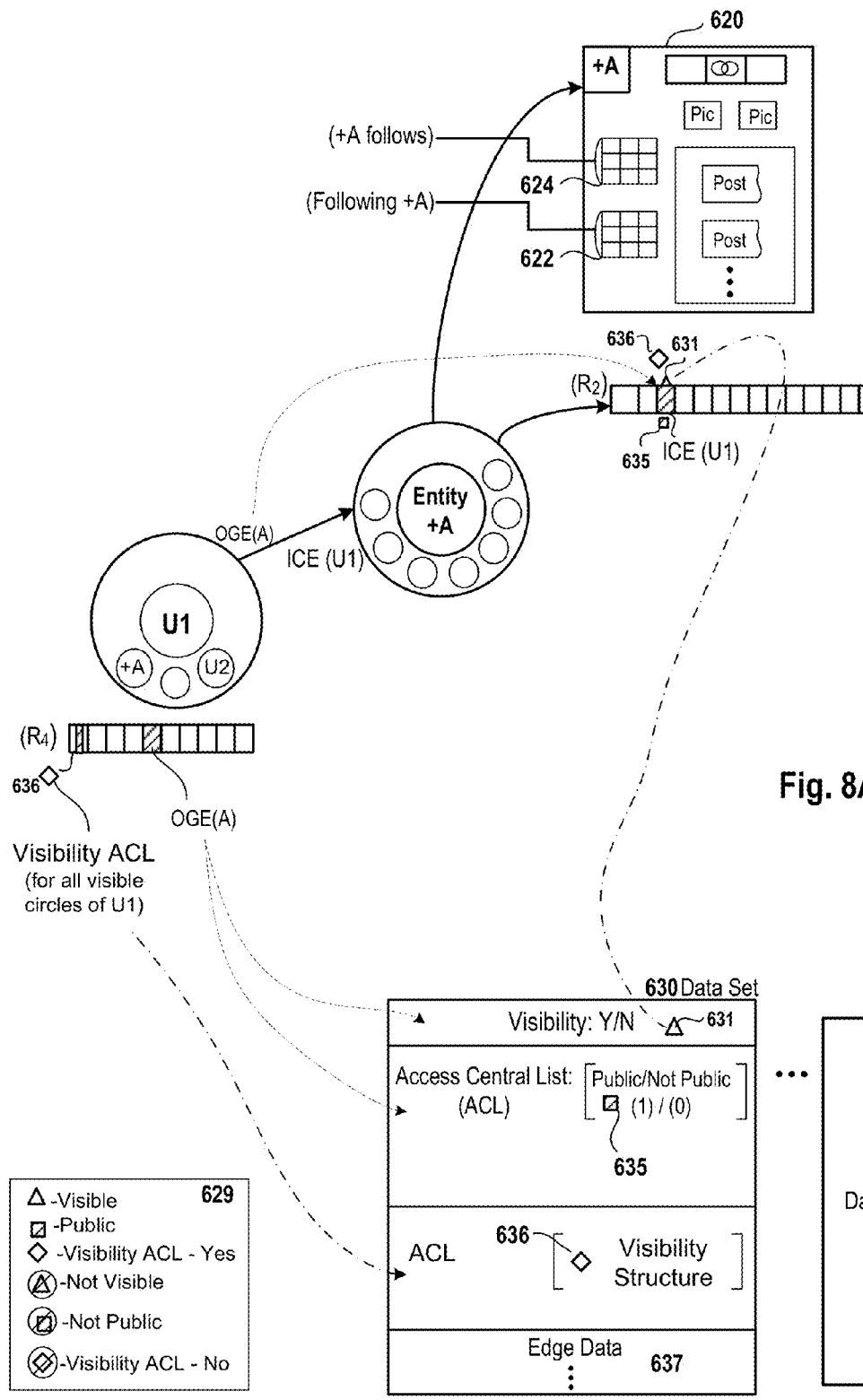
FIG. 8A illustrates an example of the type of data that is stored in the rows of particular user accounts when interfacing with other users, or entities, in accordance with one embodiment of the present disclosure.

FIG. 8A illustrates an example of the type of data that is stored in the rows of particular user accounts when interfacing with other users, or entities, in accordance with one embodiment of the present disclosure. The illustrated example is utilized to show the types of privileges that can be assigned and saved in the various rows in the database for accounts, and how that information can be used to determine whether or not information can be posted on certain entity accounts. For example, entity +A is shown associated with it entity page 620. In one embodiment, that entity page 620 is a page dedicated for entity +A in the social network. The entity +A can also interact in the social network in accordance with the various mechanical rules defined above, for example.

For instance, an entity will follow the mechanic, which prevents the entity from adding a person user to their accounts and tell the person user has added for entity to one of their circles. However, assuming that a user has determined to add entity +A to one of their circles, that entity may be able to post information regarding the user on their entity page 620. Example information that can be posted on entity page 620 can include, for example information 624 that identifies users that entity +A follows. Other information 622 that identifies users that follow entity +A can also be posted on entity page 620. When this information is posted on entity page 620, it is possible that viewers of entity page 620 may view the fact that a particular user is following entity +A.

Under certain circumstances, it may be possible that a particular user will not to disclose that he or she follows a particular entity +A. For this reason, embodiment of the present mention enables the user adding an entity that it wishes to follow to one of its circles to define the privacy parameters more specifically for that particular entity. The mechanic for managing this privacy parameter is defined here in, with reference to data set 630, which defines various parameters that can be set by the user based on their association of an entity to a particular circle.

In the example of FIG. 8A, user U1 is shown to be adding entity +A to one of its circles. When this happens, and outgoing edge OGE (A) is created which is stored in the row R4 of user U1 and the corresponding incoming edge ICE (U1) is stored in the row R2 of that entity. Based on the privacy settings established by user U1 and the circle in which user U1 places entity +A, the parameters in the data set are defined and saved to the row R4 of user U1. The data set 630 will include, for example, a visibility setting 631, an access control list (ACL) parameter for public or nonpublic 635, an access control list (ACL) parameter for a visibility structure 636, edge data 637, and other parameters. This data is part of that outgoing edge OGE (A) of user U1, and is stored in row R4 of user U1.

As used herein, the term ACL should be broadly defined to include one or more bits, or strings of bits, or combinations of data. The data may or may not be in an actual list, and can be arranged in various formats, data structures, files, storage sites, or memory. The ACL, however, will hold sufficient information or data that can be accessed, used, transferred, saved or read to make determinations regarding visibility settings, public settings, and visibility ACL settings, and the like.

Additionally, the visibility ACL 636 is also saved to row R4, but is not part of a specific outgoing edge (e.g., second edge), and instead is associated with all of the accounts stored in any one of the circles of user U1. In the example illustrated in FIG. 8A, the privacy parameters will therefore include a parameter that will identify whether or not the entity or user being added to one of the circles of a user are visible or not visible, public or not public, and whether a visibility ACL passes or does not pass, as shown in block 629. Data set 630 will therefore be present for any outgoing edge (e.g., second edge) established by a particular account in the social network. In this example, the data set 630 is shown associated with the outgoing edge OGE (A) of user U1, as user U1 has added entity +A to one of its circles. The visibility parameter 631 is shown associated as well with that incoming edge received by that added entity +A.

The visibility parameter 631, the public or not public parameter 635, and the visibility ACL 636 parameter is also passed with the incoming edge ICE (e.g., first edge) and is graphically illustrated in row R2 in the row of entity +A. In one embodiment, the visibility parameter 631, the public/not public parameter 635, and 10 that ACL parameter 636 can be represented in binary form. For example, a single bit can be used for each of the parameters, representing whether or not the information represents visible or not visible, public or nonpublic, and whether or not the visibility ACL passes. In one embodiment, only these parameters associated with the access control list (ACL) stored in the row of the user adding another user are shared in the 15 incoming edge provided to the account being added.

Other information is part of an access control list, and that information is maintained at the account that originated the adding of another account. As such, only three bits, in this example, of the ACL are provided to the entity being added with that information received in the incoming edge of the entity adding the specific account. By only providing this small amount of information in the incoming edge to the party being added, disclosure of other detailed ACL information is not compromised, and is maintained by the accounts that added the other account. In the example of FIG. 8A, user U1 does not share the entire ACL with entity +A, and instead only provides three bits that can be used in operations to determine whether or not information regarding user U1 (e.g. follower of entity +A) will be made public on the entity page 620 to other viewers in the social network that may access the entity page 620. As noted above, under some circumstances, the fact that U1 is following entity +A is not a fact that user U1 wants to disclose publicly when other account users in the social network view the pages of entity +A.

Figure 8B:
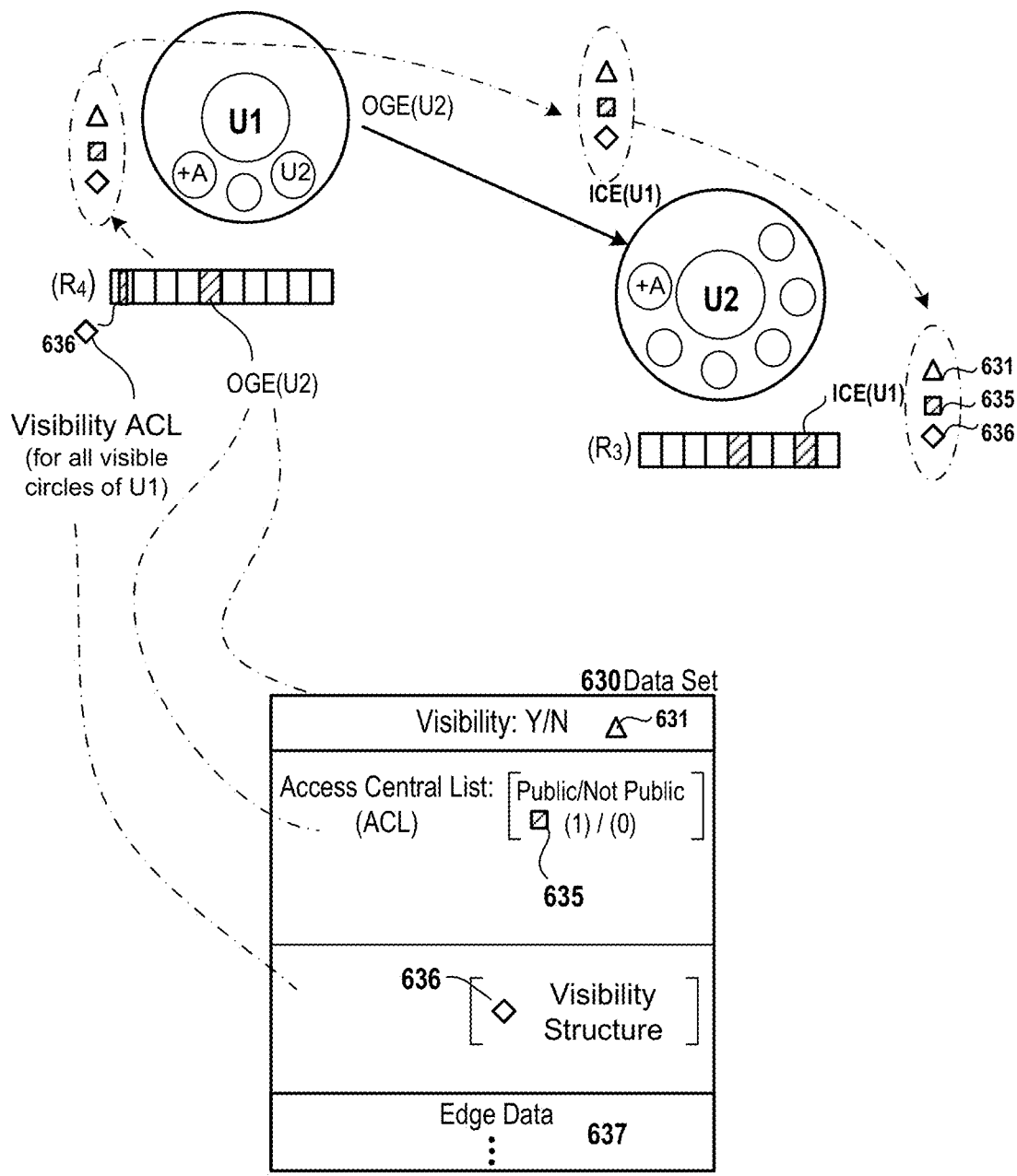
FIG. 8B illustrates an example where user U1 is adding user U2 to one of its circles, and is passing the privacy setting bits to user U2 with that incoming edge ICE (U1), in accordance with one embodiment of the present disclosure.

FIG. 8B illustrates an example where user U1 is adding user U2 to one of its circles, and is passing the privacy setting bits to user U2 with that incoming edge ICE (U1), in accordance with one embodiment of the present disclosure. As noted above, the data set 630 will include information that is stored in the outgoing edge OGE (U2) when user U1 is adding user U2. Pictorially illustrated, the addition of user U2 to one of user U1's circles causes the incoming edge ICE (U1) to provide user U2 with the privacy bits 631, 635, 636 that are stored in or with the incoming edge ICE (U1) in row R3 of user U2.

Figures 1, 9A:
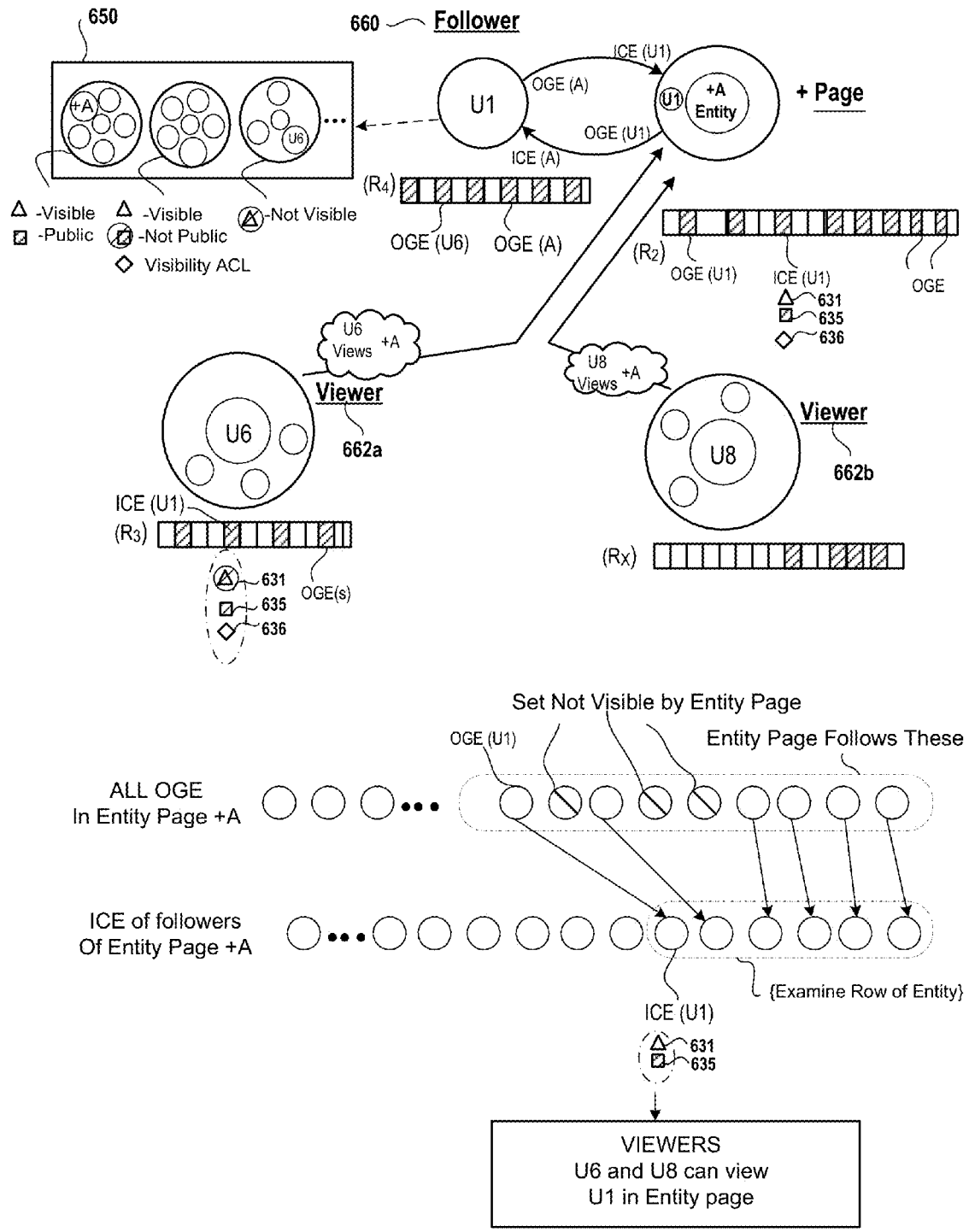
Figures 2, 9A:
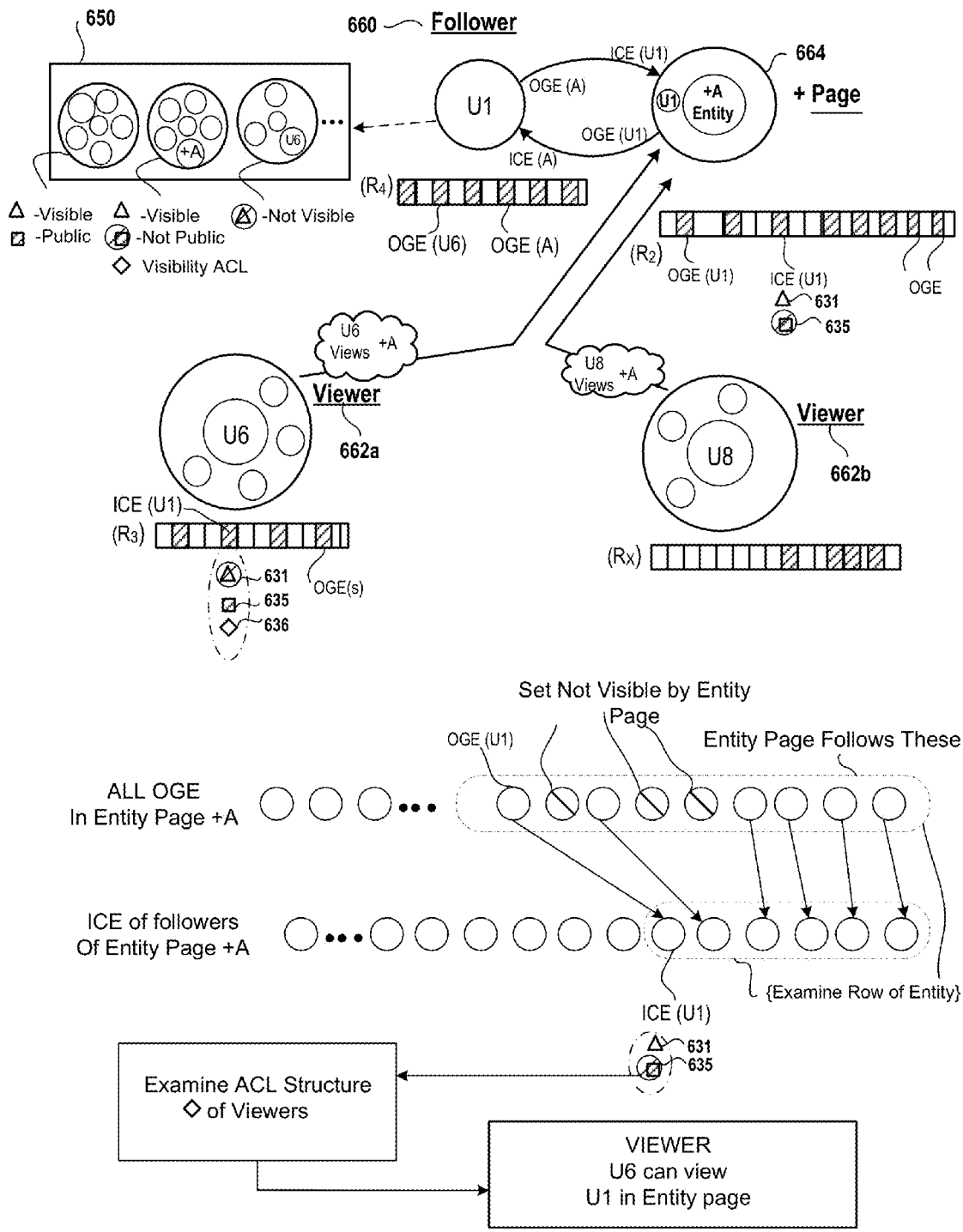
Figure 9A:
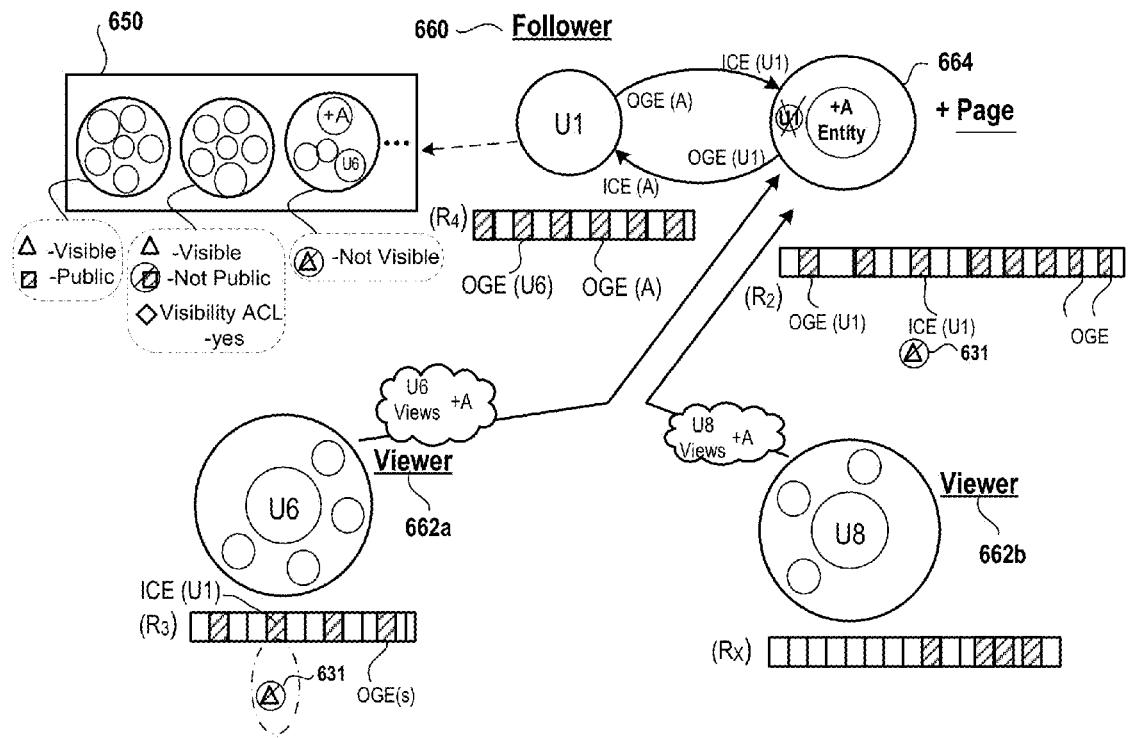
Figure 3:
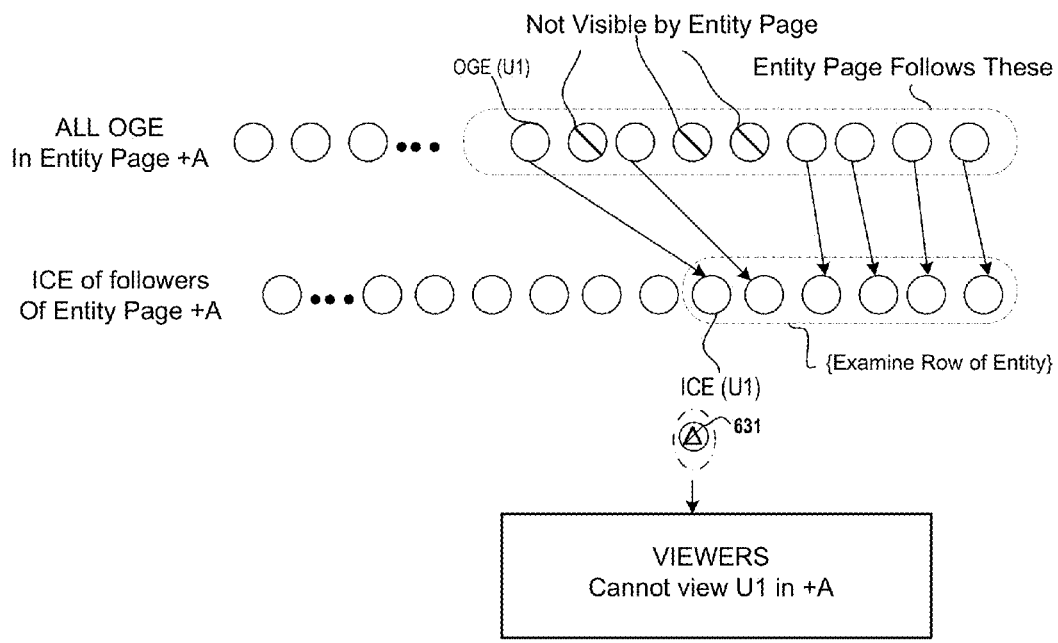

FIG. 9A-1 illustrates one case scenario, where user U1 has added entity A+ to one of its circles, which are shown in 650, in accordance with one embodiment. As shown, each of the circles managed by user U1 will have a different privacy setting, as set by user U1. As user U1 adds different accounts to its various circles, the accounts (other users or entities) will assume the privacy settings established for those particular circles. Furthermore, although only three circles are shown in 650, it should be understood that any number of circles can be created by a user in the social network to provide flexibility for assigning particular friends of the user, acquaintances of the user, and personal entities that the user wishes to follow, to particular circles having the appropriate privacy settings.

To outline the privacy settings defined by user U1, when user U1 adds a particular entity or user to one of its circles, three types of users will be defined by the example. One user is a follower, and a follower in this example is user U1 that is following entity +A. Another type of user is an entity +A, and the third category is a viewer. A viewer in this example is a user that is viewing an entity page and the user may or may not be currently within one of the circles of follower U1. As noted above, user U1 is provided with tools to manage its privacy settings, and control whether or not certain viewers of an entity page that user U1 is following can view user U1 in the content of entity page 620 (as shown in FIG. 8A).

The viewers in this example are represented by users U6 and U8. This example is simplified, and it should be understood that the mechanics described with reference to these illustrated followers, entity pages, and viewers can be extended to any number of followers, any number of entity pages and any number of viewers. The common thread among the various scenarios is that the follower of an entity (in this case user U1) can set the parameters by which other people viewing the entity page 620 will be able to see whether or not user U1 is following the entity page.

Continuing with the example of FIG. 9A-1, is shown that user U1 has added entity +A into a circle in 650, where the members of that circle are visible, and are public. Meaning, any account associated to that particular circle will be visible to the world and also public to the world. In this example, the viewer U6 is also inside of one of follower U1's circles, as user U1 has added user U6 to its circle. This will define an incoming edge ICE (U1) in both row R3 of U6 and row R2 entity +A. Row R4 also shows the outgoing edges OGE (U6) and OGE (A), identifying the ad additions made by user U1. In the row of entity +A, and outgoing edge OGE (U1) is also provided, as entity +A has added U1 to one of its circles. As noted above, is conditional that user U1 first add entity +A to one of its circles, and in this case that condition is met.

Therefore, the entity can also add U1 to one of its circles, which defines the OGE (U1) in row R2. The incoming edge ICE (U1) will also have bits 631, 635, and 636. These bits were received by entity +A and stored in R2. Bits 631, 635, and 636 were also received by user U6, when user U1 added user U6 to one of its circles. This information is stored in the row R3 of user U6. Similar information would be stored in the row Rx of user U8, based on the relationship it has with other users. In this example, user U8 does not have a relationship with user U1, as it is not currently in one of the circles of user U1, who is a follower of entity +A. However, this example shows that users U6 and U8 are both viewers of the entity page 620 of entity +A, while, user U1 is a follower of entity +A.

Once users have decided to add certain entities to their circles (e.g. groups) in their social network, these entities will automatically receive the incoming edge from those users that have decided to be followers of the entity. Using the exchange of incoming edges and outgoing edges, and the transfer of the privilege bits 631, 635, and 636 with the incoming edge from the follower will allow for efficient lookup of the privacy settings desired by a particular follower. The lookup, in one embodiment is performed by a module of the social network software, which is executed on the server. The module is configured to fetch the row of the entity that is about to be displayed to a viewer, and analysis of that single row of the entity can be performed.

Analysis of the single row is made possible because any follower of that entity will have transferred bits 631, 635 636 to the row of the entity. Additionally, as will be described below, the module may also use a second lookup of the row of the viewer, if the privacy settings cannot be determined immediately upon examining the single row of the entity. This inefficient processing therefore translates into potentially a single lookup to the database of a single row associated with the entity that is about to be displayed to a viewer. If the privacy settings cannot be determined based simply on the content of the row in the entity page, a second look up of the row of the viewer can be made to make a final determination. The module makes this final determination by deciding whether or not to show to the viewer particular followers of that particular entity.

To illustrate this single look up to the row R2 of the entity about to be viewed, FIG. 9A-1 shows an example row of all outgoing edges (shown as bubbles) of the particular entity that is about to be viewed (in this example it is entity +A). A first examination is made of the outgoing edges in R2 to determine which of those particular outgoing edges have been identified by the entity as users that it desires to follow. As noted above, and entity cannot follow a non-entity user and tell the nonentity user has decided to follow the entity. In this example, the entity has decided to follow certain ones of the outgoing edges, which represent other users that have potentially added the entity to their circles. As such, it is possible for particular entities to not follow certain users or entities, even if users have decided to follow that particular entity.

As a processing efficiency step, which can be omitted in some embodiments, the module will first identify those outgoing edges that the entity itself has decided to follow. These particular outgoing edges are shown in the first outlined group of outgoing edges, which are a subset of all outgoing edges in the entity page +A. As another efficiency processing operation, the module will then identify particular outgoing edges that the entity has set to not be visible. These outgoing edges are identified by a diagonal cross through the outgoing edge bubbles. The module has therefore reduced the number of outgoing edges that it will need to examine to determine which followers will be shown to a particular viewer. In a next processing operation, the module will then identify the specific incoming edges of the followers, which match the identified outgoing edges.

This is shown as another subset of bubbles in a list that represents the incoming edges ICEs of the followers of the entity. As noted above, when followers decide to add an entity to their group or groups (circles), the row in the database that is associated with the entity (in this case R2) will also receive the incoming edges of those followers. As such, the processing efficiency performed by the module will therefore produce a smaller subset of followers that can be examined from the single row R2.

The efficiency processing performed by the module software in the social network assists in reducing the number of followers that can be examined in a determination that can be made as to whether or not show particular followers to a particular viewer. Further, the efficiency processing is performed on a single row in the database 600, which in one embodiment is a very big table that includes many rows associate with all of the users in the social network. As noted above, one row is associated with a single user. One row is associated with nonentity users as well as one row being associated to each entity that is part of the social network.

The database 600, although can be distributed as many instances across different servers on the Internet (e.g. as a cloud service), the processing performed by the modules of the social network are made more efficient if the number of fetches (lookups) of rows from the database are reduced. If the following entities were not providing the entity with additional privilege bits 631, 635, 636 with the incoming edge stored in the row of the entity, the modules of the social network would have to examine nearly all rows in the database for the non-entity users. This would translate into potentially thousands upon thousands of lookups and examinations of the rows associate with almost all of the users. As can be appreciated, this processing could severely reduce efficiency in making the determination as to whether or not show a particular entity page to a viewer. The reduced efficiency, in one embodiment, which translates into delays in showing or displaying the entity page to a particular viewer. However, by reducing the potentially thousands of row lookups to a single lookup, or at most two lookups, will improve efficiency and speed at which entity pages are displayed to viewers in the social network, while still maintaining the desired privacy settings established by each of the followers of the entity.

Continuing with the example of FIG. 9A-1, the module of the social network can now examine each of the incoming edges stored in the row R2 to determine which followers will be displayed to a particular viewer, such as viewers 662*a* and 662*b*, each of which desire to view the entity page +A. As noted, the row R2 will contain at least bits 631 and 635. In examining the bit 631 from the incoming edge ICE (U1) of user U1, it is determined that user U1 has decided to make the fact that it follows entity +A visible.

In examining the bit 635, it is determined that the user U1 has decided to make the fact that it follows entity +A public. Based on these two bits, the module of the social network can determine to show the fact that user U1 is following the entity +A to any of the viewers. In this case, viewers U6 and U8 can freely view the fact that user U1 is following entity +A when they decide to view the content in the page of entity +A. As noted above, it is possible that entity +A will want to display a picture of user U1 to show viewers that U1 is following entity +A.

FIG. 9A-2 shows another scenario where a user U1 has added entity +A to one of its circles having a different sharing privilege set, in one embodiment of the present disclosure. It is also possible that the user U1 has decided to move entity +A to a different circle by dragging the entity out of the left most circle and into a center circle of 650. As noted above, any user can manage the circles and move users that it follows, including entities to any particular circle at any particular point, by using a function referred to as a circle editor. The function, and one embodiment is designed to allow management of the groups defined by the user, and the privileges assigned to each group.

In the example of FIG. 9A-2, the similar processing by the module or modules of the social network will perform efficiency processing on the data fetched from the row R2, which is the row from the database associated with the entity that is identified for viewing by a viewer. In this case, because the entity +A is now located in the center circle of U1, the privileges for that center circle are different than those that were set for the left most circle. In this example, user U1 has decided to make members in the center circle visible, but not public.

Not public is shown by the crossed out square, while visible is shown as a triangle that has not been crossed out. These pictorial illustrations of the settings are only provided for purposes of understanding the settings, and will not be represented or shown on the page or pages of user accounts. Instead, the settings will be provided with particular menus that will enable users to understand the settings associated with each of the circles. The menus can include drop-down menus, pop-up windows, radio buttons, etc., that allow the user to set the particular parameters of a circle.

As shown, bit 635 is crossed out, which means that user U1 has decided to make the fact that it follows entity +A not public. Logically, the processing performed by the social network modules will first determine if the privileges visible, and then it determines if it's public or nonpublic. Although the first privileges set the visible, the second privilege has been identified is not public. At this point, it determines if the visibility ACL of the viewer will allow the viewer to access those privileges. In this embodiment, bit 635 is set to not public, so another check is made to determine if the particular viewer will be provided with access to view user U1 as a follower of entity +A.

To accomplish this examination of the visibility ACL of the user, a second fetch will be made of the row associated with the viewer. In one example, the viewer U6 will have row R3, and the incoming edges are examined to determine which viewers are members of any circle of user U1. As shown, user U6 is in one of the circles of user U1, but user U8 is not in any of the circles of user U1. Thus, user U6 will have a positive bit for the visibility ACL, while user U8 does not have any incoming edges that are present in user U1's circles. As such, the examination of the viewer U6's row R3 will identify that user U6 is inside of one of the circles of U1's groups. This means that although user U1 has determined to not make the fact that it follows entity +A public, it still allows users in its circles to view the fact that it follows entity +A. However, because of the nonpublic bit 635 associated with the middle circle in 650, the fact that user U1 follows entity +A is not visible to the world (only members in his circles).

FIG. 9A-3 shows another scenario where user U1 has decided to move, or originally place entity +A in a circle that is not visible. That is, user U1 has added entity +A to a circle that is not visible, and this is communicated to that entity +A in the incoming edge ICE (U1) by transferring bit 631. Bit 631 is shown with a circle and cross out, which means that user U1 has decided to make the fact that it follows entity +A not visible.

When a viewer decides to view the entity page, the processing performed by modules or a module of the social network will perform the examination of the outgoing edges in row R2 and the incoming edges in a row R2, based on the single lookup, or fetch of row R2. By examining a single row R2, it is determined that user U1 has selected to not make the fact that it follows entity +A visible, by bit 631. This fact will therefore translate into an automatic non-showing of user U1 as a follower in entity +A's page.

Figure 10:
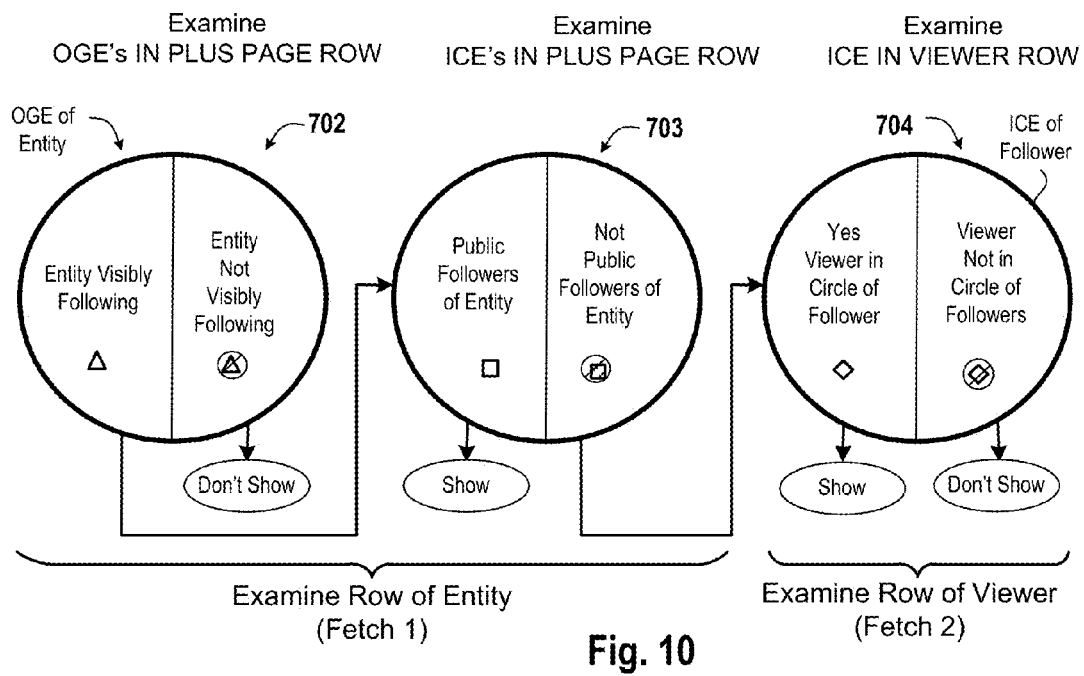
FIG. 10 illustrates a logical diagram of the operations performed by modules of the social networking software, in accordance with one embodiment of the present disclosure.

FIG. 10 illustrates a logical diagram of the operations performed by modules of the social networking software, in accordance with one embodiment of the present disclosure. The first analysis in diagram 702 and the second analysis in diagram 703 are performed on the row of the entity that is to be viewed by a viewer. As such, this analysis only uses a single fetch from the database 600. In the leftmost diagram 702, the modules of the social network will first identify all the outgoing edges of the entity.

By examining the outgoing edges of the entity, the module can determine which of those outgoing edges the entity has decided to visibly follow. If the entity has decided not the to visibly follow a particular follower, the entity page will not show those specific followers. In a next logical operation, the module will examine those followers that the entity is also following and make a determination of 20 whether those followers have identified the entity as being public or not public. If those followers identify the entity as being public, then in diagram 703 those followers will be shown. Up to this point, the processing performed by the modules or module of the social network will be simply examining the row of the entity, based on a single fetch (fetch 1). If in diagram 703 it is determined that the followers are 25 not public followers of the entity, then a further analysis is made as illustrated in diagram 704. In the diagram 704, the modules will then fetch the row of the viewer in a second fetch (fetch 2).

At this point, they can be determined if the specific viewer is in the circles or a circle of each of the followers that may be following the entity. If for example, the follower also has the viewer in one of its circles, then a determination is made that the visibility ACL setting will allow the entity to be viewed by the viewer. However, the viewer will only be allowed to view the follower in the entity page if the viewer is also a member of at least one circle of the follower. If the viewer is not in a circle of the follower, the follower will not be viewable in the entity page by the viewer.

Figure 11:
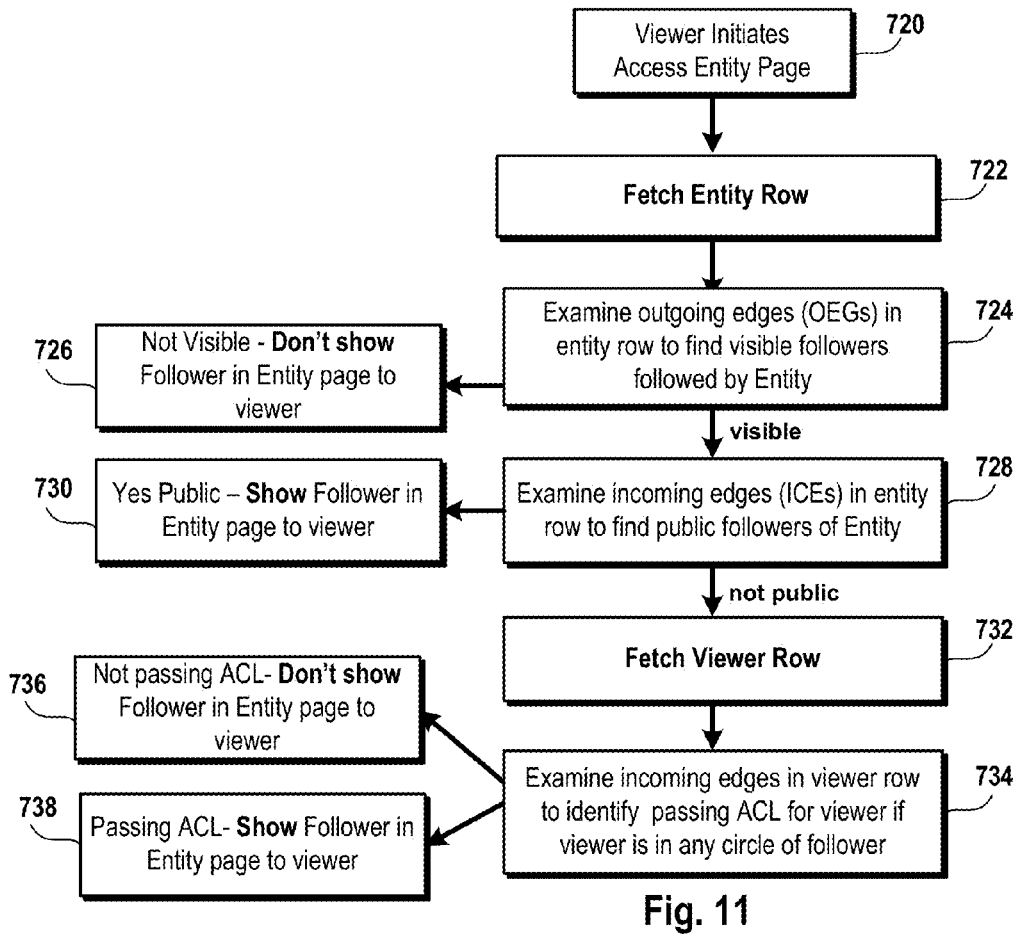
FIG. 11 illustrates a flow diagram of process operations performed by a module or modules of the social network, in accordance with one embodiment of the present disclosure.

FIG. 11 illustrates a flow diagram of process operations performed by a module or modules of the social network, in accordance with one embodiment of the present disclosure. This method illustrates one example set of operations that a module or modules of the software that operate the social network would perform to identify whether or not to show particular followers to particular viewers in an entity page. Operation 720 begins by determining that a viewer has initiated access to entity page. The viewer, in one embodiment, is a user of the social network and would have an account with the social network. Upon determining that axis has been made to the entity page, logic will cause the fetch of the row of the entity page that is being accessed. Once the row has been fetched into memory 722, the module performs operations to identify whether or not to show specific followers to the viewer.

As shown in FIG. 10, these operations would be performed on examination of the outgoing edges in the plus page row, and the incoming edges in the plus page row. In operation 724, the outgoing edges in the entity row are examined to find visible followers followed by the entity. If the entity is not visibly following specific followers, operation 726 will mark those specific followers as not visible and will not show the followers in the entity page to viewers. For those followers that the entity page has marked visible, the operation 728 will be performed by examining the incoming edges in the entity's row defined public followers of the entity.

The incoming edges in the entity's row represent the incoming edges received from followers, who have provided the bits that will allow the examination of the incoming edges. If the bit indicates that the followers wish to 10 follow the entity publicly, operation 730 will show the follower in the entity page to the viewers. If the entity examines the incoming edges and determines that particular followers do not wish to publicly follow the entity, operation 732 fetches of the viewer's row. The viewer's row will identify whether the viewer is in one of the circles of the followers in operation 734.

Thus, the modules will examine the incoming edges in the viewer's row to identify a passing ACL for the viewer if the viewer is in any circle of the follower. In operation 736, if the ACL is not passing, the follower will not be shown in the entity page to the viewer. This means that the viewer is not in any circle of the follower. In operation 738, if the ACL passes, the system will show the follower in the entity page to the viewer. Again, the ACL analysis of the viewer is performed from the second fetch of the row of the viewer, as noted in operation 732.

Figure 12:
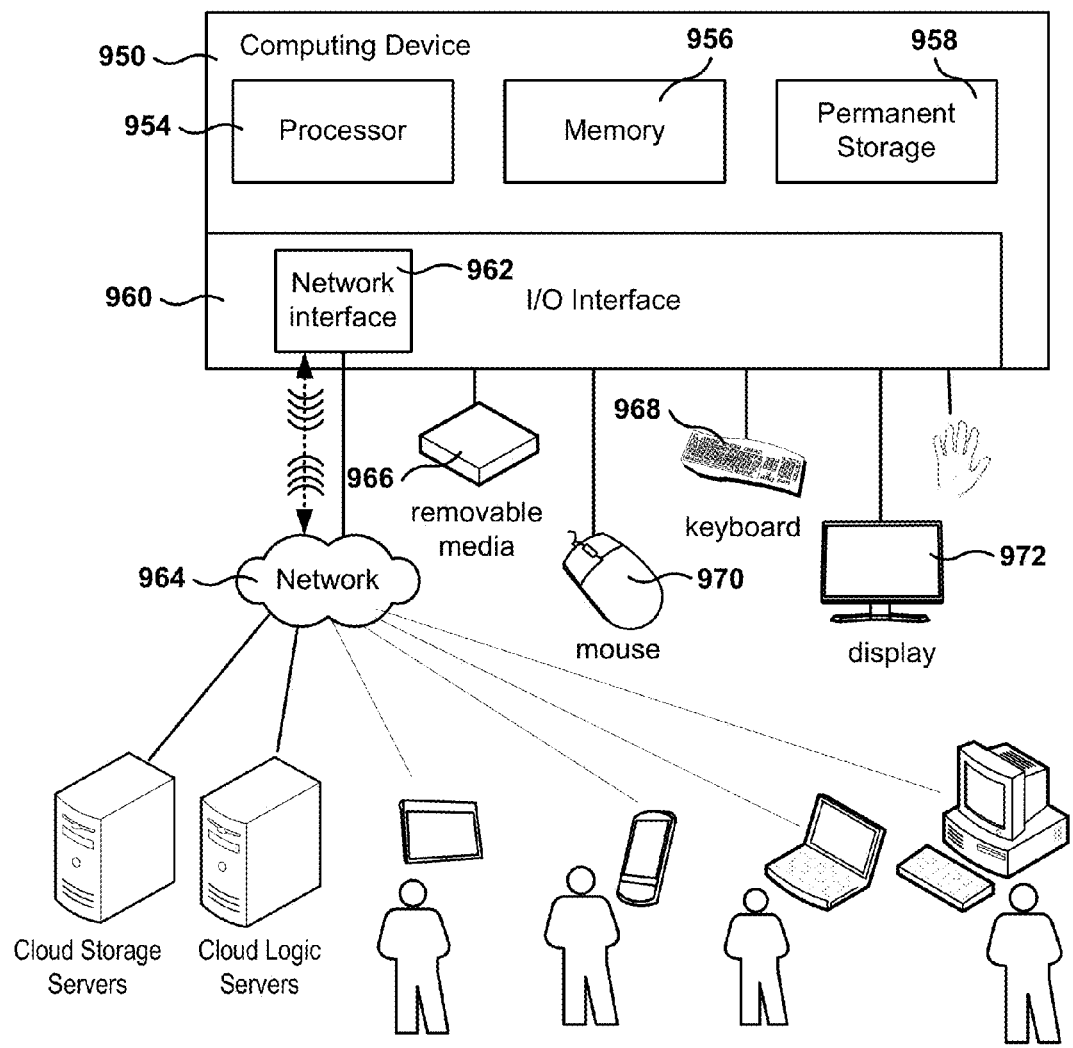
FIG. 12 is a simplified schematic diagram of a computer system for implementing embodiments of the present disclosure.

FIG. 12 is a simplified schematic diagram of a computer system for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device such as a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 954 of FIG. 12. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 964. Network 964 can be, for example the Internet. The Internet is interconnected with a plurality of devices, such as cloud storage servers, cloud logic servers, user interface devices, etc. Some devices that can communicate with the Internet access services on various cloud logic servers and cloud storage can include, for example tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable communication regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:

receiving, by a processor, a request to view an entity page of an entity by a viewer, the viewer having a user account in a social network and the entity having an entity account in the social network;

fetching, by the processor, a first data associated with the entity, the first data including first edge (FE) data that identify a first plurality of users of the social network that have added the entity to one of their following groups, the first data further including second edge (SE) data that identify a second plurality of users that the entity has added to one of its following groups, wherein the FE data include a first indicator relating to visibility and a second indicator relating to being public;

establishing, by the processor based on the first and second indicators, a first determination as to whether certain ones of the first plurality of users are to be displayed as following the entity in the entity page, wherein the first determination decides whether the certain ones of the first plurality of users are visible and whether the certain ones of the first plurality of users are public, to cause users that are not identified as visible not to be displayed in the entity page to the viewer;

fetching, by the processor, a second data associated with the viewer, establishing a second determination as to whether the viewer is in one of the groups of the second plurality of users, wherein whether to present users that are identified as visible but not as public depends on the second determination; and presenting, by the processor, for display users that are following the entity to the viewer when the users pass one of the first determination or the first and second determinations.

2. The method of claim 1, wherein the first data and the second data are obtained from a data structure.

3. The method of claim 1, wherein the first indicator is provided by a first bit and the second indicator is provided by a second bit.

4. The method of claim 1, wherein the second determination identifies FE data of the second data associated with the viewer to determine if an access control list (ACL) bit validates that the viewer is in one of the groups of the first plurality of users.

5. The method of claim 1, wherein the first and second indicators are defined by the first plurality of users.

6. The method of claim 5, wherein the first and second indicators in the FE are updatable based on changes made by the first plurality of users, the changes including at least one of deleting the entity from a following group, or moving the entity to a following group having different settings for the first and second indicators.

7. The method of claim 1, wherein the second determination identifies if the viewer is not in one of the following groups of the users that follow the entity, and not displaying the users that follow the entity to the viewer when the viewer is not in one of the following groups.

8. The method of claim 4, wherein the ACL bit is stored in the second data and is set associated with all FE in the second data of the viewer, the first and second indicators being associated with corresponding second edges in the second data.

9. The method of claim 4, wherein the ACL bit is obtained based on settings of the following groups of each user, such that the entity adheres to the settings defined by each user so that viewers only view those followers that allow the entity to display their status as following the entity to viewers of the entity page.

10. The method of claim 1, wherein the first determination and the second determination are performed by analysis of the first data and the second data fetched from a database.

11. The method of claim 4, wherein each user that follows the entity passes the first and second indicators to the entity in a first edge so that the first determination can be made directly from the first data of the entity.

12. The method of claim 11, wherein whether to present certain ones of the users that follow the entity to the viewer is determined based on incoming edges in the second data of the viewer.

13. A method, comprising:
 detecting, by a processor, a request to view, by a viewer, an entity page of an entity in a social network, the entity having users that follow the entity;
 fetching, by the processor, a first row of data from a database associated with the social network, the first row being of the entity and the first row of data including a set of bits from the users that follow the entity;
 establishing, by the processor, a first determination as to whether certain ones of the users that are following the entity are to be displayed as following the entity in the entity page based on the set of bits;
 fetching, by the processor, a second row of data from the database, the second row of data associated with the viewer,
 establishing, by the processor, a second determination as to whether the viewer is in one of groups of the users that are following the entity; and
 displaying, by the processor, users that are following the entity to the viewer when the users pass one of the first determination or the first and second determination,
 wherein the second determination is to validate whether the viewer is in one of the groups of the users that are following the entity based on an access control list (ACL) bit in the second row of data.

14. The method of claim 13, wherein the first row of data including first edge (FE) data that identify a first plurality of users of the social network that have added the entity to one of their following groups, the first row of data further including second edge (SE) data that identify a second plurality of users that the entity has added to one of its following groups, wherein the FE data include the set of bits, the set of bits including a visible bit and a public bit.

15. The method of claim 14, wherein the set of bits in the FE of users are updatable based on changes made by the first plurality of users, the changes including at least one of deleting the entity from the following groups or moving the entity to a following group having different settings for the set of bits.

16. The method of claim 13, wherein each user that follows the entity passes the set of bits to the entity in a first edge so that the first determination is made from the first row of data of the entity.

17. The method of claim 16, wherein whether to display certain ones of the users that follow the entity to the viewer is determined based on first edges in the second row of data of the viewer.

18. A non-transitory computer-readable storage medium having stored thereon program instructions that when execute, causing a processor to perform operations comprising:
 detecting a request to view, by a viewer, an entity page of an entity in a social network, the entity having users that follow the entity;
 fetching a first row of data from a database associated with the social network, the first row being of the entity and the first row of data including a set of bits from users that follow the entity;
 establishing a first determination as to whether certain ones of the users that are following the entity are to be displayed as following the entity in the entity page based on the set of bits;
 fetching a second row of data from the database, the second row of data associated with the viewer,
 establishing, by the processor, a second determination as to whether the viewer is in one of groups of the users that are following the entity; and
 displaying users that are following the entity to the viewer when the users pass one of the first determination or the first and second determination,
 wherein the second determination is to validate whether the viewer is in one of the groups of the users that are following the entity based on an access control list (ACL) bit in the second row of data.

19. The non-transitory computer-readable storage medium of claim 18, wherein the first row of data including first edge (FE) data that identify a first plurality of users of the social network that have added the entity to one of their following groups, the first row of data further including second edge (SE) data that identify a second plurality of users that the entity has added to one of its following groups, wherein the FE data include the set of bits, the set of bits including a visible bit and a public bit.

20. A system comprising:
a memory; and
a processing device, coupled to the memory, to:
receive a request to view an entity page of an entity by a viewer, the viewer having a user account in a social network and the entity having an entity account in the social network;
fetch a first data associated with the entity, the first data including first edge (FE) data that identify a first plurality of users of the social network that have added the entity to one of their following groups, the first data further including second edge (SE) data that identify a second plurality of users that the entity has added to one of its following groups, wherein the FE data include a first indicator relating to visibility and a second indicator relating to being public;

establish, based on the first and second indicators, a first determination as to whether certain ones of the first plurality of users are to be displayed as following the entity in the entity page, wherein the first determination decides whether the certain ones of the first plurality of users are visible and whether the certain ones of the first plurality of users are public, to cause users that are not identified as visible not to be displayed in the entity page to the viewer; fetch a second data associated with the viewer, establish a second determination as to whether the viewer is in one of the groups of the second plurality of users, wherein whether to present users that are identified as visible but not as public depends on the second determination; and present for display users that are following the entity to the viewer when the users pass one of the first determination or the first and second determinations.

* * * * *

UNITED STATES PATENT AND TRADEMARK OFFICE
CERTIFICATE OF CORRECTION

| | | |
|---|---|---|
| PATENT NO. | : 9,069,856 B1 | Page 1 of 1 |
| APPLICATION NO. | : 13/668166 | |
| DATED | : June 30, 2015 | |
| INVENTOR(S) | : Jean-Christophe Emmanuel Lilot and Nishant Atul Thakkar | |

It is certified that error appears in the above-identified patent and that said Letters Patent is hereby corrected as shown below:

On the title page, item (72), Inventor 2 middle name, delete "Antul" and insert --Atul--

Signed and Sealed this
Third Day of November, 2015

Michelle K. Lee
*Director of the United States Patent and Trademark Office*